United States Patent
Osada et al.

(10) Patent No.: US 9,984,485 B2
(45) Date of Patent: May 29, 2018

(54) VIRTUAL TRY-ON APPARATUS, VIRTUAL TRY-ON METHOD, AND COMPUTER PROGRAM PRODUCT

(71) Applicants: KABUSHIKI KAISHA TOSHIBA, Minato-ku, Tokyo (JP); TOSHIBA SOLUTIONS CORPORATION, Kawasaki-shi, Kanagawa (JP)

(72) Inventors: Kunio Osada, Tokyo (JP); Toshimasa Dobashi, Kanagawa (JP); Hisao Yoshioka, Tokyo (JP); Shigeru Mikami, Kanagawa (JP); Yumi Inomata, Kanagawa (JP); Hiroki Ueda, Tokyo (JP)

(73) Assignees: KABUSHIKI KAISHA TOSHIBA, Tokyo (JP); TOSHIBA SOLUTIONS CORPORATION, Kawasaki-Shi (JP)

( * ) Notice: Subject to any disclaimer, the term of this patent is extended or adjusted under 35 U.S.C. 154(b) by 0 days. days.

(21) Appl. No.: 14/669,110

(22) Filed: Mar. 26, 2015

(65) Prior Publication Data
US 2016/0042542 A1    Feb. 11, 2016

(30) Foreign Application Priority Data

Aug. 8, 2014 (JP) ................. 2014-163117

(51) Int. Cl.
*G06T 11/60* (2006.01)
*G06F 3/01* (2006.01)
(Continued)

(52) U.S. Cl.
CPC ............. *G06T 11/60* (2013.01); *G06F 3/005* (2013.01); *G06F 3/011* (2013.01); *G06F 3/017* (2013.01);
(Continued)

(58) Field of Classification Search
None
See application file for complete search history.

(56) References Cited

U.S. PATENT DOCUMENTS 8,275,590 B2   9/2012   Szymczyk et al.
8,674,989 B1   3/2014   Dalal et al.
(Continued)

FOREIGN PATENT DOCUMENTS

CN       1375791     10/2002
CN     101582143     11/2009
(Continued)

OTHER PUBLICATIONS

Youtube screen capture for TIC Singapore (Youtube video, "Magic Mirror @ Parco next NEXT Phenomenom 2012", https://www.youtube.com/watch?v=y_1xlXZxzW8, published on Mar. 13, 2013.).*

(Continued)

*Primary Examiner* — Yu Chen
(74) *Attorney, Agent, or Firm* — Amin, Turocy & Watson LLP

(57) ABSTRACT

According to an embodiment, an apparatus includes an acquisition unit, a first controller, an acceptor, a generator, and a second controller. The acquisition unit is configured to acquire characteristic information on a subject. The first controller is configured to generate a screen according to the acquired characteristic information and display the display screen on a first display. The screen contains clothing images corresponding to the acquired characteristic information in first information in which the characteristic information and the clothing images are associated with each other. The acceptor is configured to accept from the subject a selection of an image of clothing to be tried on from among the clothing images displayed on the first display. The generator is configured to generate a composite image of a subject (Continued)

image of the subject and the selected clothing image. The second controller is configured to display the composite image on a second display.

9 Claims, 19 Drawing Sheets

(51) Int. Cl.
G06F 3/00 (2006.01)
G06F 3/03 (2006.01)
G06Q 10/00 (2012.01)
(52) U.S. Cl.
CPC ........... *G06F 3/0304* (2013.01); *G06Q 10/00* (2013.01); *G06T 2210/16* (2013.01)

(56) References Cited

U.S. PATENT DOCUMENTS

| | | | |
|---|---|---|---|
| 8,732,584 B2 | 5/2014 | Lee et al. | |
| 2002/0004763 A1* | 1/2002 | Lam | G06F 1/26 705/26.44 |
| 2002/0133432 A1 | 9/2002 | Yamashita | |
| 2006/0271448 A1* | 11/2006 | Inoue | G06Q 10/087 705/26.41 |
| 2007/0130020 A1 | 6/2007 | Paolini | |
| 2008/0306895 A1* | 12/2008 | Karty | G06Q 10/04 706/52 |
| 2011/0078055 A1 | 3/2011 | Faribault et al. | |
| 2011/0246329 A1* | 10/2011 | Geisner | G06F 3/017 705/27.1 |
| 2012/0086783 A1* | 4/2012 | Sareen | G06N 3/006 348/47 |
| 2012/0306919 A1* | 12/2012 | Suzuki | G06Q 30/0643 345/633 |
| 2012/0313969 A1* | 12/2012 | Szymczyk | G06Q 30/0603 345/633 |
| 2013/0057553 A1* | 3/2013 | Chakravarthula | G06F 3/011 345/468 |
| 2013/0185679 A1 | 7/2013 | Fretwell et al. | |
| 2013/0215116 A1 | 8/2013 | Siddique et al. | |
| 2013/0300739 A1* | 11/2013 | Fan | G06T 17/10 345/420 |
| 2013/0321412 A1* | 12/2013 | Coon | G06T 17/00 345/420 |
| 2014/0040041 A1* | 2/2014 | Ohnemus | G06Q 30/0627 705/14.66 |
| 2014/0052549 A1 | 2/2014 | Dollens | |
| 2014/0118396 A1 | 5/2014 | Sugita et al. | |
| 2014/0207611 A1* | 7/2014 | Cleary | G06Q 30/0633 705/26.8 |
| 2014/0226000 A1* | 8/2014 | Vilcovsky | G06F 3/017 348/77 |
| 2014/0358738 A1* | 12/2014 | Ohnemus | G06Q 30/0643 705/27.2 |
| 2015/0134495 A1* | 5/2015 | Naware | G06T 19/20 705/27.2 |
| 2016/0042443 A1 | 2/2016 | Osada et al. | |
| 2016/0042564 A1 | 2/2016 | Osada et al. | |
| 2016/0042565 A1 | 2/2016 | Osada et al. | |
| 2016/0109954 A1* | 4/2016 | Harris | G06F 3/017 345/156 |
| 2017/0080346 A1* | 3/2017 | Abbas | A63F 13/825 |

FOREIGN PATENT DOCUMENTS

| | | |
|---|---|---|
| CN | 103226388 | 7/2013 |
| CN | 103440587 | 12/2013 |
| CN | 105989617 | 10/2016 |
| JP | 08-251391 | 9/1996 |
| JP | 10-293529 | 11/1998 |
| JP | 2002-183539 | 6/2002 |
| JP | 2003-108593 | 4/2003 |
| JP | 2005-286496 | 10/2005 |
| JP | 2006-012050 | 1/2006 |
| JP | 2006-249618 | 9/2006 |
| JP | 2009-230231 | 10/2009 |
| JP | 2010-076602 | 4/2010 |
| JP | 2013-025290 | 2/2013 |
| JP | 2014-089665 | 5/2014 |
| JP | 2014-095950 | 5/2014 |
| KR | 2014133665 | 11/2014 |

OTHER PUBLICATIONS

Charles E. Gardner (Background and Clothing Considerations for Portraits, "https://web.archive.org/web/20110812024056/http://super.nova.org/DPR/Backgrounds/", Aug. 12, 2011).*
Non-Final Office Action for U.S. Appl. No. 14/672,339 dated Jul. 15, 2016, 29 pages.
Final Office Action for U.S. Appl. No. 14/674,230 dated Oct. 17, 2016, 25 pages.
Non-Final Office Action for U.S. Appl. No. 14/674,230 dated Jun. 30, 2016, 24 pages.
Final Office Action for U.S. Appl. No. 14/672,339 dated Dec. 16, 2016, 30 pages.

* cited by examiner

FIG.4

| KIND OF CLOTHING | CLOTHING ID | CHARAC-TERISTIC INFORMA-TION | POSTURE INFORMA-TION | ORDER OF LAYERS | ALIGNMENT INFORMA-TION | CLOTHING IMAGE |
|---|---|---|---|---|---|---|
| TOPS | | | | | | |
| | | | | | | |
| | | | | | | |
| INNERS | | | | | | |
| | | | | | | |
| | | | | | | |
| BOTTOMS | | | | | | |
| | | | | | | |
| | | | | | | |
| ⋮ | | | | | | |
| | | | | | | |
| | | | | | | |
| ⋮ | | | | | | |
| | | | | | | |
| | | | | | | |
| ⋮ | | | | | | |
| | | | | | | |
| | | | | | | |

| TRANS-MISSION DATE AND TIME | STORE ID | TRY-ON SUBJECT ID | COMBINA-TION ID | CLOTHING ID (TOPS) | CLOTHING ID (INNERS) | CLOTHING ID (BOTTOMS) |
|---|---|---|---|---|---|---|
| | | | | | | |
| | | | | | | |
| | | | | | | |

| CLOTHING ID | ATTRIBUTE INFORMATION ||
| --- | --- | --- |
|  | STORE INFORMATION | BONUS INFORMATION |
|  |  |  |
|  |  |  |
|  |  |  |

FIG.17

| RELATIONSHIP BETWEEN PREDICTED TIME ts AND SCHEDULED WAITING TIME tw | DISPLAY CONDITIONS |
|---|---|
| $ts < tw$ | DISPLAY CONDITION 1 (M1 CLOTHING IMAGES AND CLOTHING OF ALL S1 KINDS) |
| $tw < ts < 2tw$ | DISPLAY CONDITION 2 (M2 CLOTHING IMAGES AND CLOTHING OF S2 KINDS OUT OF ALL KINDS) |
| $2tw < ts < 3tw$ | DISPLAY CONDITION 3 (M3 CLOTHING IMAGES AND CLOTHING OF S3 KINDS OUT OF ALL KINDS) |
| $3tw < ts$ | DISPLAY CONDITION 4 (M4 CLOTHING IMAGES AND CLOTHING OF S4 KINDS OUT OF ALL KINDS) |

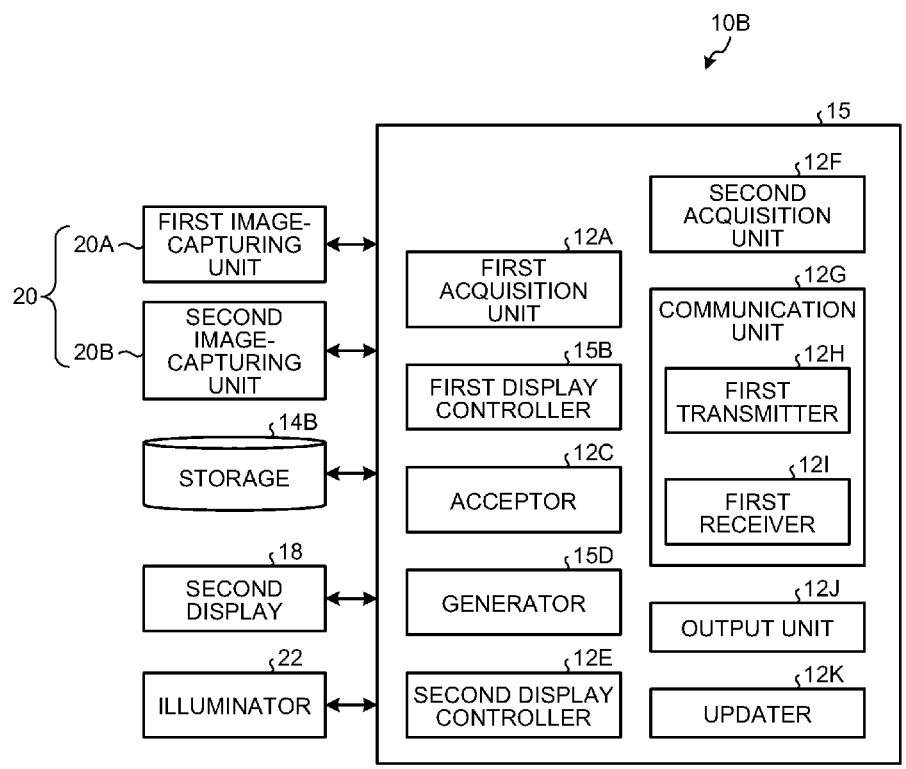

FIG.22
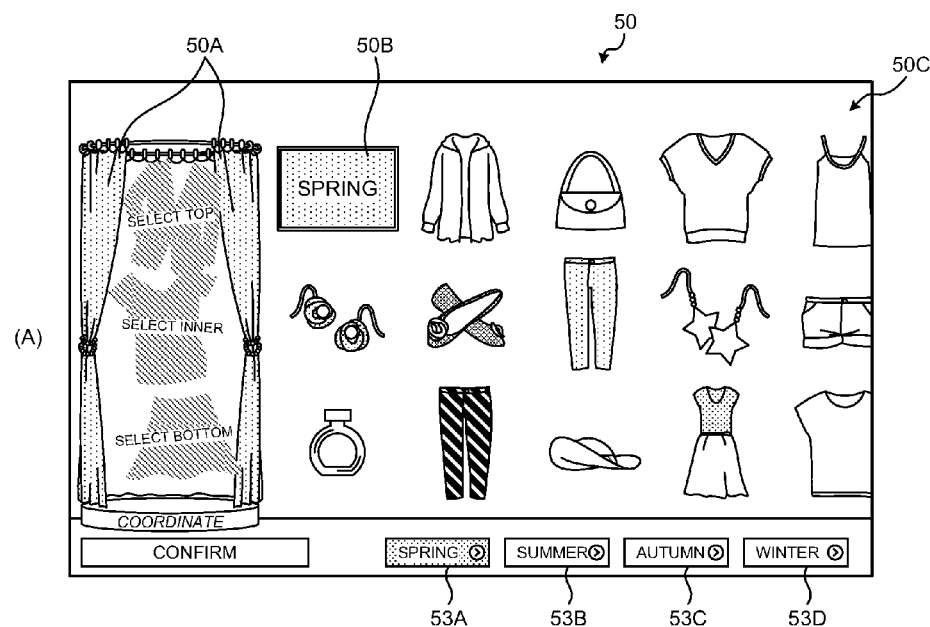
(A)
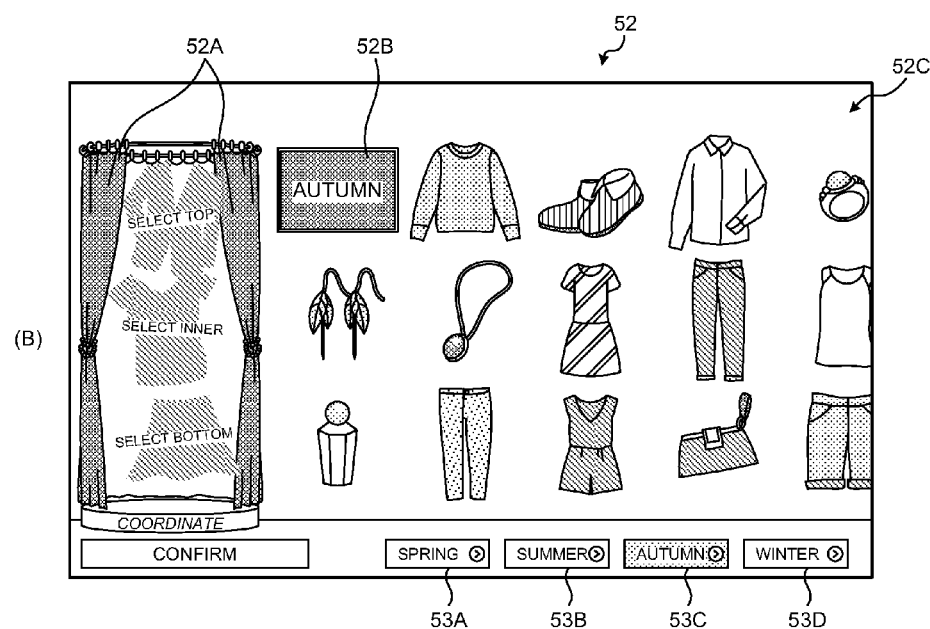
(B)

VIRTUAL TRY-ON APPARATUS, VIRTUAL TRY-ON METHOD, AND COMPUTER PROGRAM PRODUCT

CROSS-REFERENCE TO RELATED APPLICATION

This application is based upon and claims the benefit of priority from Japanese Patent Application No. 2014-163117, filed on Aug. 8, 2014; the entire contents of which are incorporated herein by reference.

FIELD

Embodiments described herein relate generally to a virtual try-on apparatus, a virtual try-on method, and a computer program product.

BACKGROUND

There have been disclosed techniques for displaying virtual images describing the tried-on state of clothing to be tried on. For example, there have been disclosed techniques for displaying composite images describing the states of a user trying on clothing.

BRIEF DESCRIPTION OF THE DRAWINGS

FIG. 4 is a diagram illustrating one example of a data structure of first information;

FIG. 17 is a diagram illustrating one example of a data structure of fourth information;

FIG. 19 is a functional block diagram of a virtual try-on apparatus;

FIG. 20 is a diagram illustrating one example of a data structure of fifth information;

FIG. 22 illustrates examples of display screens; and

DETAILED DESCRIPTION

Conventionally, it has been difficult to provide a virtual try-on service suited for each try-on subject.

According to an embodiment, a virtual try-on apparatus includes a first acquisition unit, a first display controller, an acceptor, a generator, and a second display controller. The first acquisition unit is configured to acquire characteristic information on a try-on subject. The first display controller is configured to generate a display screen according to the acquired characteristic information and display the display screen on a first display. The display screen contains clothing images corresponding to the acquired characteristic information in first information in which the characteristic information and the clothing images are associated with each other. The acceptor is configured to accept from the try-on subject a selection of an image of clothing to be tried on from among the clothing images displayed on the first display. The generator is configured to generate a composite image of a try-on subject image of the try-on subject and the selected clothing image. The second display controller is configured to display the composite image on a second display.

Embodiments of a virtual try-on apparatus, a virtual try-on method, and a program will be described below in detail with reference to the accompanying drawings.

First Embodiment

Figure 1:
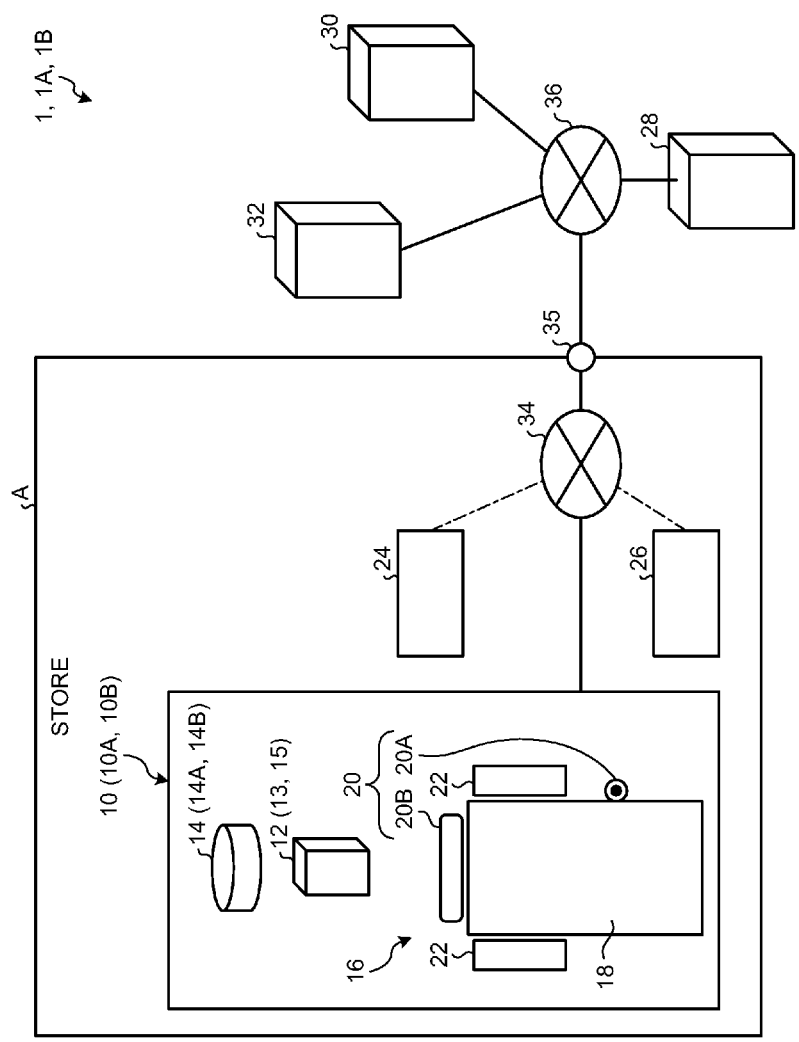
FIG. 1 is a schematic view of a virtual try-on system.

FIG. 1 is a schematic view of a virtual try-on system 1 of the embodiment.

The virtual try-on system 1 includes a virtual try-on apparatus 10, a first terminal 24, a second terminal 26, a first server device 28, a third server device 30, and a second server device 32. The virtual try-on apparatus 10, the first terminal 24, the second terminal 26, the first server device 28, the third server device 30, and the second server device 32 are connected together via a publicly-known communication network such as the Internet.

In the embodiment, the virtual try-on apparatus 10, the first terminal 24, and the second terminal 26 are used in a specific area (at a store A in the embodiment) and connected together via a local area network (LAN) 34 built in the store A. The virtual try-on apparatus 10, the first terminal 24, and the second terminal 26 are also communicably connected via the LAN 34, a GW (gateway) 35, and the Internet 36 to the first server device 28, the third server device 30, and the second server device 32.

In the embodiment, as an example, it is assumed that the virtual try-on apparatus 10, the second terminal 26, and the first terminal 24 are used in a specific area. Also in the embodiment, it is assumed that the specific area is in the store A where products are sold and services are provided to customers. However, the specific area is not limited to a store.

The virtual try-on system 1 is not limited to the mode in which the virtual try-on apparatus 10, the second terminal 26, and the first terminal 24 are used in the specific area. For example, the virtual try-on system 1 may be configured in a mode in which at least one of the virtual try-on apparatus 10, the second terminal 26, and the first terminal 24 is used in a different area.

In the embodiment, descriptions will be given as to a mode in which one second terminal 26 and one or more first terminals 24 are connected to one virtual try-on apparatus 10 installed in one store A. However, the number of the virtual try-on apparatuses 10 installed in one area (for example, in the store A) and the numbers of the first terminals 24 and the second terminals 26 connectable to each of the virtual try-on apparatuses 10 are not limited to the foregoing numbers.

In addition, FIG. 1 presents one area (store A) for simplification of the description. Alternatively, the virtual try-on apparatus 10, the first terminal 24, and the second terminal 26 are installed in each of a plurality of areas.

The virtual try-on apparatus 10 is an apparatus that displays a composite image of an image of a try-on subject and images of clothing.

The virtual try-on apparatus 10 includes a controller 12, a storage 14, and a main body unit 16. The controller 12 controls components of the virtual try-on apparatus 10. The main body unit 16 includes a second display 18, an image-capturing unit 20, and illuminators 22. The virtual try-on apparatus 10 may further include a printing device that prints a composite image and/or a transmitter that transmits a composite image to an external device via a network or the like.

The image-capturing unit 20 includes a first image-capturing unit 20A and a second image-capturing unit 20B.

The first image-capturing unit 20A shoots a try-on subject to capture an image of the try-on subject. The first image-capturing unit 20A shoots the try-on subject at predetermined time intervals. The first image-capturing unit 20A sequentially outputs the images of the try-on subject acquired by the shooting to the controller 12. Since the first image-capturing unit 20A continuously shoots the try-on subject and outputs the images to the controller 12, the controller 12 can obtain moving images including a plurality of images of the try-on subject shot at different times.

The try-on subject is a subject trying on clothing. The try-on subject may be a living thing or a non-living thing as far as it tries on clothing. The living thing may be a person, for example. However, the living thing is not limited to a person but may be an animal such as a dog or a cat. The non-living thing may be a dummy of a human body or an animal body or any other object, but is not limited to this. The try-on subject may be a living thing or a non-living thing wearing clothing.

The clothing here refers to articles the try-on subject can put on. For example, the clothing may be outer wears, skirts, pants, shoes, hats, and others. However, the clothing is not limited to outer wears, skirts, pants, shoes, hats, and others.

The images of the try-on subject are bitmap images in the embodiment. The image of the try-on subject is an image with prescribed pixels values indicative of colors, brightness, and others. The first image-capturing unit 20A is a publicly-known image capturing device that can capture the images of the try-on subject.

The second image-capturing unit 20B acquires a depth map by shooting/image-capturing.

The depth map may be also referred to as a distance image. The depth map is an image that prescribes a distance from the second image-capturing unit 20B for each of the pixels. In the embodiment, the depth map may be generated from the image of the try-on subject by a publicly-known method such as stereo matching, or may be acquired by shooting the try-on subject using the second image-capturing unit 20B under the same shooting conditions as those for capturing the image of the try-on subject. The second image-capturing unit 20B is a publicly-known image capturing device that can acquire the depth map.

In the embodiment, the first image-capturing unit 20A and the second image-capturing unit 20B shoot the try-on subject at the same timing. The first image-capturing unit 20A and the second image-capturing unit 20B are controlled by the controller 12 to sequentially shoot images in a synchronized manner at the same timing. Then, the image-capturing unit 20 sequentially outputs the images of the try-on subject and the depth maps acquired by the shooting, to the controller 12.

The second display 18 is a device that displays various images. The second display 18 is a publicly-known display device such as a liquid crystal display device, for example. In the embodiment, the second display 18 displays a composite image generated at the controller 12 described later.

The second display 18 is incorporated into one plane of a rectangular housing, for example. In relation to the embodiment, descriptions will be given as to the case where the second display 18 is formed in a size equal to or larger than a person's life size. However, the size of the second display 18 is not limited to the foregoing one.

Figure 2:
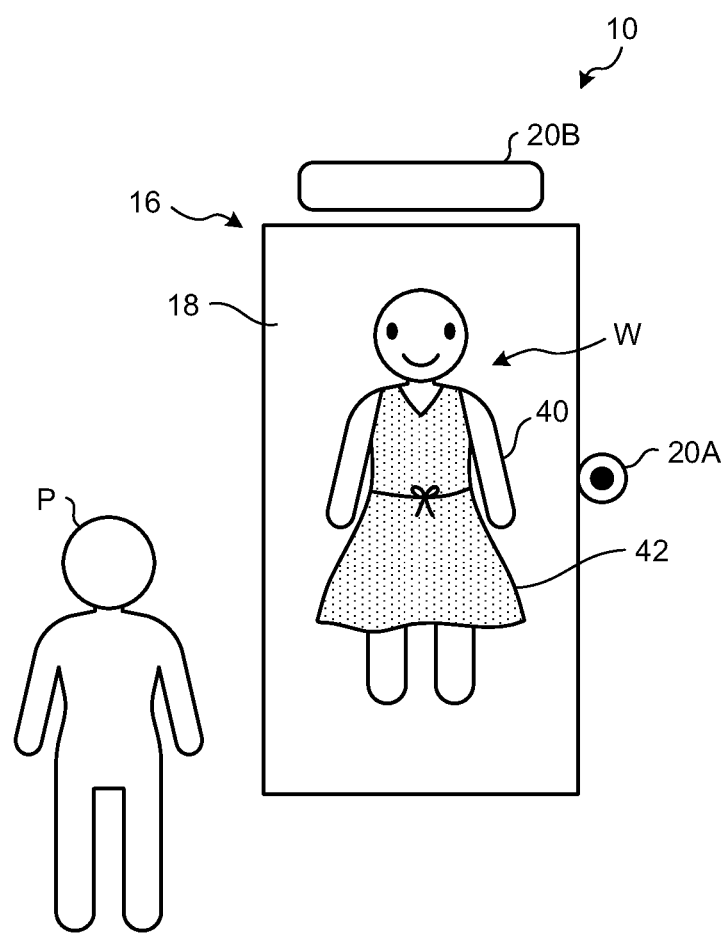
FIG. 2 is a schematic view of a positional relationship between a main body unit and a try-on subject.

FIG. 2 is a schematic view of a positional relationship between the main body unit 16 and a try-on subject P.

The controller 12 (not illustrated in FIG. 2) displays on the second display 18 a composite image W describing the state of the try-on subject P trying on various kinds of clothing. FIG. 2 illustrates the composite image W of a try-on subject image 40 and a clothing image 42 as an example. The try-on subject P such as a person stands facing a display surface of the second display 18 and views the composite image W presented on the second display 18, for example. The second image-capturing unit 20B and the first image-capturing unit 20A are adjusted in advance in shooting directions so as to be capable of shooting the try-on subject P facing the display surface of the second display 18.

Returning to FIG. 1, the illuminators 22 are provided on both side surfaces of the second display 18. The illuminators 22 are publicly-known light sources. The illuminators 22 are adjusted in advance in the direction of light illumination so as to be capable of illuminating the try-on subject P facing the display surface of the second display 18 with light. The main body unit 16 may not be configured to include the illuminators 22.

The storage 14 is a publicly-known hard disc device that stores various data.

The first terminal 24 is a publicly-known personal computer. In the embodiment, descriptions will be given as to the case where the first terminal 24 is a portable terminal. The first terminal 24 is a terminal operated by the try-on subject to select the image of clothing to be tried on. In the embodiment, descriptions will be given as to the case where one or more first terminals 24 are provided in the store A, as an example. However, the first terminal 24 may be a mobile terminal held by the try-on subject or the like.

The second terminal 26 is a publicly-known personal computer. In the embodiment, the second terminal 26 is used as an operating terminal that transmits various instructions to the virtual try-on apparatus 10.

In relation to the embodiment, descriptions will be given as to the case where the first terminal 24 and the second terminal 26 are separately formed. However, the first terminal 24 and the second terminal 26 may be integrated.

Alternatively, at least two of the virtual try-on apparatus 10, the second terminal 26, and the first terminal 24 may be integrated.

The first server device 28 is a content distribution server device on the Internet. In the embodiment, the first server device 28 generates bonus information (described later in detail) according to at least one of the try-on subject and the images of clothing to be tried on selected by the try-on subject.

The second server device 32 updates first information (described later in detail) and distributes the same to the virtual try-on apparatus 10 and others. The third server device 30 is a server device that can process big data and analyzes information on users' purchases accumulated in various server devices on the Internet. In the embodiment, the third server device 30 generates a recommendation image describing recommended clothing for the try-on subject.

In the embodiment, the user refers to a general term for operators including the try-on subject and other persons.

In relation to the embodiment, descriptions will be given as to the case where the first server device 28, the second server device 32, and the third server device 30 are separately formed. However, at least two of the first server device 28, the second server device 32, and the third server device 30 may be integrated.

Figure 3:
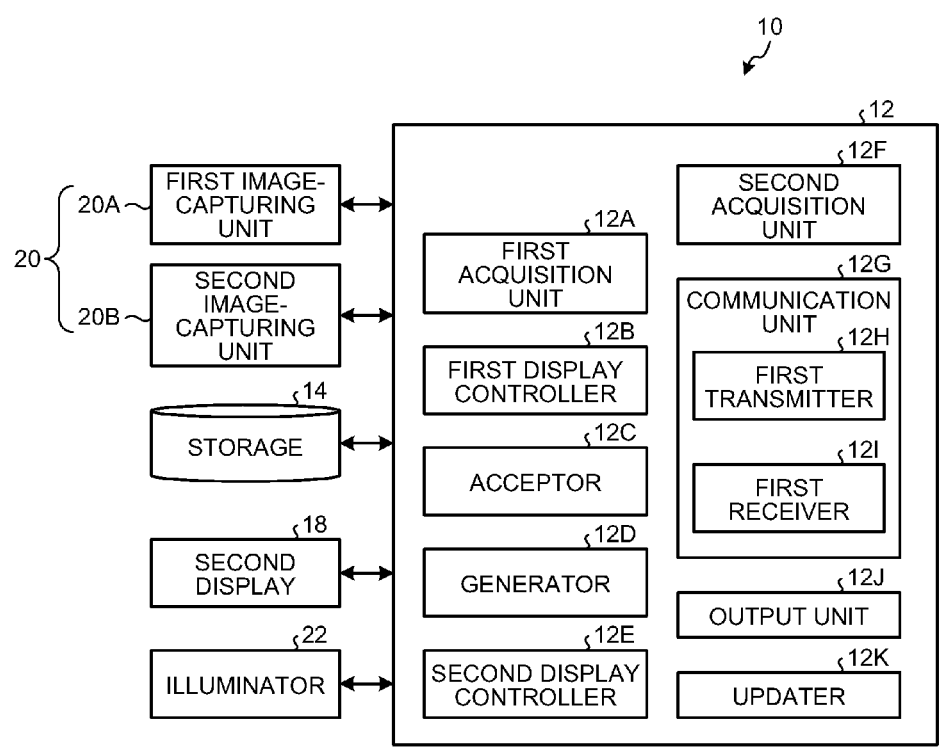
FIG. 3 is a functional block diagram of a virtual try-on apparatus.

FIG. 3 is a functional block diagram of the virtual try-on apparatus 10.

The virtual try-on apparatus 10 includes the controller 12, the image-capturing unit 20, the storage 14, the second display 18, and the illuminators 22. The image-capturing unit 20, the storage 14, the second display 18, and the illuminators 22 are connected to the controller 12 so as to be capable of transmitting and receiving signals.

The storage 14 stores various data. In the embodiment, the storage 14 stores various data such as first information and second information.

FIG. 4 is a diagram illustrating one example of a data structure of the first information.

The first information indicates associations among the kind of clothing, clothing identification information (hereinafter, referred to as clothing ID), characteristic information, posture information, order of layers, alignment information, and images of clothing. There is no limitation on data form of the first information but the first information may be provided in a database or a table. The first information needs to have at least associations between the images of clothing and the characteristic information, and may further have associations among other kinds of information.

The kinds of clothing indicate a plurality of kinds into which clothing is classified under pre-decided classification conditions. The classification conditions include a condition for indicating what part of a human body (for example, the upper part or the lower part of the body) clothing is to be worn, a general order of layers of clothing to be worn in combination, and the like. However, the classification conditions are not limited to the foregoing ones. The kinds of clothing may include tops, outers, bottoms, and inners, but are not limited to them.

The clothing IDs (clothing identification information) are information for identifying clothing. The clothing is ready-to-wear clothing, for example. The clothing IDs may be product numbers, names of clothing, or the like, for example, but are not limited to them. The product numbers may be publicly-known EAN (European Article Number) codes or JAN (Japanese Article Number) codes, for example, but are not limited to them. The names may be product names of clothing, for example.

The characteristic information indicates characteristics of the try-on subject. The characteristic information is classified and associated in advance with the clothing IDs according to the colors or materials of the clothing identified by the clothing IDs, and is included in the first information.

The characteristic information specifically includes at least one of outer characteristics and inner characteristics of the try-on subject. The inner characteristics include the try-on subject's preferences. The inner characteristics may include additional characteristics.

The outer characteristics may include body shape parameters indicative of the body shape of the try-on subject, characteristic colors of the try-on subject, the age bracket in which the try-on subject resides, for example. The outer characteristics may include additional characteristics.

The characteristic colors of the try-on subject refer to colors suiting the try-on subject that are predetermined according to the skin color, eye color, and hair color of the try-on subject. The suiting colors are phases of colors identical or similar to the skin color, eye color, and hair color of the try-on subject. The characteristic colors are equivalent to "personal colors" called in the U.S. and Japan. The characteristic colors are not limited to the foregoing ones. For example, the characteristic colors may be colors preferred by the try-on subject.

The body shape parameters are information indicative of a body shape. The body shape parameters include one or more parameters. The parameters are measurement values of one or more sites in a human body. The values of the parameters are not limited to actually measured values but include estimated values and values equivalent to the actually measured values (for example, arbitrary values input by the user).

Specifically, the body shape parameters include at least one parameter of bust, waist, hip, height, width, and weight. The parameters included in the body shape parameters are not limited to them. For example, the body shape parameters may further include parameters such as sleeve, inseam, and the like.

The images of clothing are images of clothing identified by the corresponding clothing IDs. In relation to the embodiment, descriptions will be given as to the case where clothing images indicate the state in which the clothing is put on a human body or a human-shaped model. The clothing images in the first information may include a first clothing image describing the state in which the clothing is put on the model or the like described above and a second clothing image describing the state in which the clothing is placed and arranged in shape on a floor surface or the like. That is, the first clothing image is an image of worn clothing, and the second clothing image is an image of clothing placed and arranged in shape.

The order of layers is information indicating that, when the clothing identified by the corresponding clothing IDs are to be put on a human body or the like in layers, each piece of the clothing is to be positioned in which of the layers ranging from the bottom layer closest to the human body to the top layer distant from the human body. The first information has in advance a recommended order of layers of the clothing identified by the corresponding clothing IDs.

The alignment information indicates the outlines of portions of clothing characterizing the body shape of the user wearing the clothing in the corresponding clothing images. For example, the alignment information indicates the outlines of portions corresponding to the shoulders, neck, bust, armpits, laps, thighs, head, ankles, and the like of the human body in the corresponding clothing images. Among them, the alignment information preferably is the outline of the shoulders of the human body in the clothing images, but is not limited to this.

The posture information indicates the posture of the subject to wear the clothing at the time of acquisition of the clothing image. More specifically, the posture information indicates the posture of the subject at the time of acquisition of the first clothing image. The posture information indicates the orientation, motion, and the like of the subject relative to the image capturing device by which the clothing image (first clothing image) is captured.

The orientation of the subject refers to the orientation of the subject to wear the clothing in the clothing images relative to the image capturing device at the time of acquisition of the clothing images. For example, the orientation of the subject may include a front-facing orientation in which the face and body of the subject fully face the image capturing device, a lateral-facing orientation in which the face and body of the subject laterally face the image capturing device, and an orientation other than the front-facing orientation and the lateral-facing orientation.

In the embodiment, the first information associates one each clothing ID with one piece of characteristic information, one order of layers, and a plurality of pieces of posture information. The first information further associates each of the plurality of clothing images with the alignment information corresponding to each of the clothing images, in correspondence with the plurality of pieces of posture information.

The first information may further have associations with other information relating to clothing. For example, the first information may further have associations with sex, age bracket, clothing size (store clothing size), and the like of a person who is assumed to put on the corresponding clothing. The first information may further have associations with clothing attribute information corresponding to the corresponding clothing images. The clothing attribute information indicates a store, manufacturer, brand name, and the like of the clothing identified by the corresponding clothing ID.

Next, the second information will be described.

The second information includes the clothing IDs of the clothing to be tried on, which is input by the user operating the first terminal 24. The virtual try-on apparatus 10 receives the second information from the first terminal 24 and stores the same in the storage 14.

Figures 5, 6:
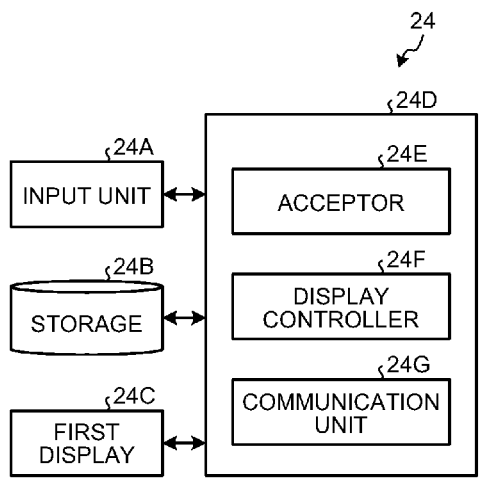
FIG. 5 is a diagram illustrating one example of a data structure of second information.
FIG. 6 is a functional block diagram of a first terminal.

FIG. 5 is a diagram illustrating one example of a data structure of the second information. The second information associates transmission date and time, store ID, try-on subject ID, combination ID, and one or more clothing IDs.

The transmission date and time indicate the date and time when the second information was transmitted from the first terminal 24 to the virtual try-on apparatus 10. The store ID is information for identifying an area where the virtual try-on apparatus 10 is installed (the store A in the embodiment). The try-on subject ID is information for uniquely identifying the try-on subject. The combination ID is information for identifying one or more combinations of clothing IDs of clothing to be tried on. As the clothing IDs of the clothing in the combination identified by the combination ID, the second information includes one or more clothing IDs for each of the kinds of clothing. In the example of FIG. 5, the second information includes as the clothing IDs corresponding to the combination ID, the clothing ID for the kind of clothing "tops," the clothing IDs for the kind of clothing "inners," and the clothing IDs for the kind of the clothing "bottoms."

That is, the plurality of clothing IDs corresponding to the try-on subject ID and the combination ID indicates the images of the plurality of pieces of clothing to be tried on in combination, which are selected by the try-on subject.

Returning to FIG. 3, the controller 12 of the virtual try-on apparatus 10 includes a first acquisition unit 12A, a first display controller 12B, a acceptor 12C, a generator 12D, a second display controller 12E, a second acquisition unit 12F, a communication unit 12G, an output unit 12J, and an updater 12K.

Some or all of the first acquisition unit 12A, the first display controller 12B, the acceptor 12C, the generator 12D, the second display controller 12E, the second acquisition unit 12F, the communication unit 12G, the output unit 12J, and the updater 12K may be realized by causing a processing device such as a CPU (central processing unit) to execute programs, that is, may be realized by software, or may be realized by hardware such as a IC (integrated circuit), or may be realized by a combination of software and hardware.

The first acquisition unit 12A acquires characteristic information on the try-on subject. In the embodiment, the first acquisition unit 12A acquires the characteristic information on the try-on subject from the first terminal 24. When the try-on subject operates the first terminal 24 to input the characteristic information, the first terminal 24 transmits the characteristic information to the virtual try-on apparatus 10 (described later in detail). Accordingly, the first acquisition unit 12A acquires the characteristic information.

The first display controller 12B displays images of clothing corresponding to the characteristic information acquired by the first acquisition unit 12A in the first information on a first display 24C of the first terminal 24 (described later in detail with reference to FIG. 6). The first display 24C is a display provided on the first terminal 24 as described later in detail.

More specifically, the first display controller 12B controls display on the first display 24C by transmitting to the first terminal 24 the images of clothing corresponding to the characteristic information acquired by the first acquisition unit 12A in the first information.

As described above with reference to FIG. 4, the first information associates one each piece of characteristic information with a plurality of pieces of posture information and the images of clothing corresponding to the plurality of pieces of posture information. Accordingly, the first display controller 12B reads the images of clothing corresponding to a pre-decided posture information (for example, front-facing orientation) out of the plurality of pieces of posture information corresponding to the acquired characteristic information, and transmit the same to the first terminal 24.

If the first information includes, as the images of clothing, the first clothing image describing the state in which the clothing is put on a model or the like and the second clothing image describing the state in which the clothing is placed and arranged in shape on a floor surface or the like, the first display controller 12B reads the characteristic information and the second clothing image corresponding to the posture information on "front-facing orientation" and transmit the same to the first terminal 24. In this case, the virtual try-on apparatus 10 can display on the first terminal 24 the second clothing image describing the state in which the clothing is placed and arranged in shape.

The first display controller 12B may display the clothing attribute information corresponding to the characteristic information acquired by the first acquisition unit 12A on the first display 24C of the first terminal 24.

The first display controller 12B preferably further displays on the first display 24C recommended images at the virtual try-on system 1 side. The recommended images refer to images of recommended clothing extracted from the plurality of clothing images registered in the first information, according to a pre-decided extraction condition. The recommended images may be images of combinations of recommended clothing indicated by combinations of a plurality of clothing images. The recommended combination images are indicated by combinations of a plurality of clothing images. For example, the recommended combination images include combinations of images of clothing of the individual kinds. The first display controller 12B acquires the recommended combination images from the third server device 30 and displays the same on the first display 24C. Hereinafter, descriptions will be given as to the case where the recommended images are the recommended combination images, as an example. However, the recommended images are not limited to combinations of clothing images.

The extraction condition is at least one of the characteristic information on the try-on subject, images of clothing previously selected by the try-on subject, images of clothing previously selected by other try-on subjects, images of clothing recommended by a store selling clothing, images of clothing recommended by other try-on subjects selected in advance by the try-on subject, images of clothing according to a body shape fitting to or similar to the body shape of the try-on subject, and images of clothing selected in the past by other try-on subjects with preferences fitting to or similar to the preferences of the try-on subject. The other try-on subjects preferably have characteristic information fitting to or similar to the characteristic information on the try-on subject, for example. The other try-on subjects selected in advance by the try-on subject are famous persons or celebrities preferred by the try-on subject, for example.

The recommended combination images are generated by the third server device 30 described later (described later in detail).

The acceptor 12C accepts from the try-on subject a selection of the image of clothing to be tried on from among the images of clothing displayed on the first display 24C of the first terminal 24. In the embodiment, the acceptor 12C accepts the selection from the try-on subject by accepting the clothing ID of the clothing image selected by the try-on subject operating the first terminal 24 from the first terminal 24. Specifically, the acceptor 12C accepts the selection of the image of clothing to be tried on by accepting the foregoing second information from the first terminal 24.

The number of the clothing IDs of the selected images of clothing to be tried on, accepted by the acceptor 12C, is not limited to one but may be two or more. That is, the acceptor 12C may accept from the try-on subject a selection of the images of a plurality of pieces of clothing to be tried on in combination. In this case, the acceptor 12C accepts from the first terminal 24, the second information including the plurality of clothing IDs, the combination ID of the combination of the plurality of clothing images identified by the plurality of clothing IDs, the try-on subject ID, the transmission date and time, and the store ID.

In addition, the acceptor 12C may accept from the try-on subject a selection of clothing attribute information on the clothing to be tried on. In this case, the acceptor 12C accepts the selection from the try-on subject by accepting from the first terminal 24 the clothing ID corresponding to the clothing attribute information selected by the try-on subject operating the first terminal 24. Specifically, the acceptor 12C accepts the selection of the clothing attribute information on the clothing to be tried on by accepting the foregoing second information from the first terminal 24

The second acquisition unit 12F acquires body shape parameters indicative of the body shape of the try-on subject.

In the embodiment, the second acquisition unit 12F acquires the body shape parameters by calculating the body shape parameters of the try-on subject from a depth map.

Specifically, the second acquisition unit 12F first acquires the depth map of the try-on subject by extracting a person area from the depth map acquired from the second image-capturing unit 20B.

The second acquisition unit 12F extracts the person area by setting a threshold value of a distance along the depth out of the three-dimensional positions of pixels constituting the depth map, for example. For instance, in a camera coordinate system of the second image-capturing unit 20B, it is assumed that the position of the second image-capturing unit 20B is set at an origin point and a Z-axis forward direction is parallel to an optical axis of a camera extended toward the subject (try-on subject) from the origin point of the second image-capturing unit 20B. In this case, of all the pixels constituting the depth map, pixels with values equal to or larger than a predetermined threshold (for example, a value indicative of 1 m) in the position coordinate along the depth direction (Z-axis direction) are excluded. Accordingly, the second acquisition unit 12F acquires from the second image-capturing unit 20B the depth map composed of pixels in the person area within the threshold, that is, the depth map of the try-on subject.

Next, the second acquisition unit 12F calculates the body shape parameters of the try-on subject from the depth map of the try-on subject acquired from the second image-capturing unit 20B.

For example, the second acquisition unit 12F applies human-body three-dimensional model data (three-dimensional polygon model) to the depth map of the try-on subject. Then, the second acquisition unit 12F uses the depth map and the three-dimensional model data applied to the try-on subject to calculate the values of parameters included in the body shape parameters (for example, the values of height, bust, waist, hip, width, and others). In such a manner, the second acquisition unit 12F acquires the body shape parameters of the try-on subject.

The second acquisition unit 12F may receive from the first terminal 24 the parameters indicative of the body shape input by the try-on subject operating the first terminal 24. Accordingly, the second acquisition unit 12F may acquire the body shape parameters.

The generator 12D generates a composite image of the try-on subject image and the selected clothing image. Specifically, the generator 12D generates a composite image of the try-on subject image shot by the first image-capturing unit 20A and the selected clothing image. When the first information includes, as the clothing images, the first clothing image describing the state in which the clothing is put on a model or the like and the second clothing image describing the state in which the clothing is put and arranged in shape on a floor surface or the like, the generator 12D preferably uses the first clothing image for generation of the composite image.

The generator 12D preferably corrects the selected clothing image according to the acquired body shape parameters to generate a corrected image. Then, the generator 12D superimposes the image corrected according to the body shape parameters on the try-on subject image to generate a composite image.

At that time, the generator 12D aligns the outline of portions corresponding to characteristic areas of the human body (for example, shoulders, hip, and the like) in the try-on subject image with the outline of the clothing indicated by the alignment information corresponding to the clothing image (or corrected image) to be superimposed, thereby to generate a composite image in which the clothing image (or corrected image) is superimposed on the try-on subject image. Accordingly, the clothing image is aligned with the body line of the try-on subject image before the composition.

The generator 12D preferably generates the composite image in which the clothing image is superimposed on the try-on subject image according to posture information corresponding to the posture of the try-on subject in the try-on subject image.

In this case, the generator 12D first calculates the posture information on the try-on subject from the depth map of the try-on subject acquired from the second image-capturing unit 20B.

Specifically, the generator 12D first generates first skeletal information indicative of a skeletal position of a human body for each of pixels constituting the acquired depth map of the try-on subject. The generator 12D generates the first skeletal information by applying a human body shape to the depth map.

Then, the generator 12D converts a coordinate system indicating each pixel position in the generated first skeletal information (that is, a coordinate system of the second image-capturing unit 20B) into a coordinate system indicating each pixel position in the try-on subject image acquired by the first image-capturing unit 20A (that is, a coordinate system of the first image-capturing unit 20A). The coordinate conversion is performed by carrying out publicly-known calibration. Accordingly, the generator 12D generates the first skeletal information after the coordinate conversion as skeletal information.

Then, the generator 12D calculates posture information on the try-on subject from the generated skeletal information. The generator 12D may calculate the orientation of the try-on subject (posture information) by a publicly-known method from the positions of joints in the body indicated by the skeletal information on the try-on subject.

Alternatively, the generator 12D may calculate the posture information on the try-on subject from the depth map of the try-on subject by OpenNI (Open Natural Interaction) or the like.

Then, the generator 12D reads, out of the clothing images corresponding to each of the clothing IDs accepted from the first terminal 24, a clothing image corresponding to the calculated posture information on the try-on subject as a target of composition. Then, the generator 12D generates a composite image by superimposing the clothing image (corrected image) selected by the try-on subject corresponding to the posture information, on the try-on subject image shot at the same timing as that of the depth map used for the calculation of the posture information. In the embodiment, the generator 12D generates a composite image by superimposing the selected clothing image (corrected image) on a mirror image of the try-on subject image such that the try-on subject facing the second display 18 can check the composite image as if the try-on subject looks in a mirror.

When the second information accepted from the first terminal 24 includes a plurality of clothing IDs, that is, when the try-on subject selects images of a plurality of pieces of clothing to be tried on in combination, the generator 12D generates a composite image by superimposing the selected plurality of clothing images on the try-on subject image in the same manner as described above.

In this case, the generator 12D reads the order of layers corresponding to the selected plurality of clothing IDs from the first information. Then, the generator 12D sequentially superimposes the clothing images corresponding to the plurality of clothing IDs selected as try-on targets, on the try-on subject image, in the corresponding order of layers. At that time, the generator 12D removes from the images to be superimposed (the try-on subject image and the clothing images) overlapping areas between the images in the lower layers (the try-on subject image and clothing images) and the superimposed images in the upper layers (clothing images) to sequentially superimpose the images from the lower layers toward the upper layers. In such a manner, the generator 12D generates a composite image.

Upon receipt of an instruction for changing the orders of layers from the try-on subject operating an input unit provided in the virtual try-on apparatus 10 but not illustrated, the generator 12D may generate a composite image again in the instructed order of layers.

In this case, for example, the try-on subject operates the input unit provided in the virtual try-on apparatus 10 but not illustrated to input the clothing images to be changed in the order of layers and a new order of layers. The generator 12D of the controller 12 generates a composite image again according to the clothing images and the new order of layers accepted from the input unit.

The generator 12D may receive the instruction for changing the orders of layers from another external device or may generate a composite image changed in the order of layers according to a pre-decided gesture of the try-on subject with motions of his/her hands or feet indicating the instruction for changing the orders of layers. In this case, for example, the generator 12D analyzes the try-on subject image acquired by the first image-capturing unit 20A to determine whether the try-on subject has made the pre-decided gesture indicative of the instruction for change.

The second display controller 12E displays the composite image on the second display 18. Accordingly, as illustrated in FIG. 2, the second display 18 presents a composite image W in which the clothing image 42 is superimposed on the try-on subject image 40. The composite image W is formed such that the characteristic area such as the shoulders in the try-on subject image 40 is aligned with the characteristic area such as the shoulders in the clothing image 42 as described above. In addition, the composite image is formed such that the image of the clothing to be tried on selected by the try-on subject is corrected according to the body shape parameters of the try-on subject, and then the corrected image is superimposed on the try-on subject image 40. This makes it possible to provide the composite image W in a more natural manner.

Returning to FIG. 3, the second display controller 12E may display the composite image on the first display 24C of the first terminal 24. In this case, the second display controller 12E transmits the generated composite image to the first terminal 24.

The communication unit 12G is a publicly-known communication interface for communications with the first terminal 24, the second terminal 26, the first server device 28, the third server device 30, and the second server device 32.

The communication unit 12G includes a first transmitter 12H and a first receiver 12I.

The first transmitter 12H transmits various data to the first terminal 24, the second terminal 26, the first server device 28, the third server device 30, or the second server device 32. The first receiver 12I receives various data from the first terminal 24, the second terminal 26, the first server device 28, the third server device 30, or the second server device 32.

In the embodiment, the first transmitter 12H transmits try-on information to the first server device 28 (server device) connected via a network. The try-on information includes a clothing ID for identifying the image of clothing to be tried on (first identification information) and the try-on subject ID of the try-on subject to try-fit the clothing in the clothing image (second identification information). The try-on information may further include at least one of the clothing image corresponding to the clothing ID, the try-on subject image, and the composite image. The try-on information may further include other information.

In the embodiment, upon receipt of an instruction for image capturing from the try-on subject while the composite image is displayed on the second display 18, the first transmitter 12H transmits to the first server device 28 the try-on information including the clothing ID of the clothing image included in the displayed composite image, the clothing image corresponding to the clothing ID, and the try-on subject ID of the try-on subject in the try-on subject image included in the composite image.

The first receiver 12I receives from the first server device 28 bonus information corresponding to at least one of the clothing ID (first identification information) and the try-on subject ID (second identification information) included in the try-on information.

The bonus information refers to, for example, code information usable at a virtual store on the Internet, various coupons such as cash vouchers and discount tickets usable at a real store of the clothing corresponding to the clothing ID. For example, the try-on subject can receive various services such as discounts provided at the virtual store by inputting the code information through the input screen on a web page of the virtual store on the Internet. In addition, the try-on subject can receive various services such as discounts by displaying a coupon as the bonus information on the first terminal 24 or printing the same on a paper medium and showing the coupon at the target store.

The first receiver 12I may receive from the first server device 28 the URL (uniform resource locator) of a web page on which the clothing image corresponding to the clothing ID included in the try-on information and the attribute information corresponding to the clothing image are arranged. In addition, the bonus information may also be provided on this web page.

The output unit 12J outputs the bonus information received from the first server device 28. When receiving the URL from the first server device 28, the output unit 12J outputs the URL. In the embodiment, the outputting refers to at least one of display, transmission, and printing.

Specifically, the output unit 12J outputs the bonus information or the URL received from the first server device 28 by displaying the same on the second display 18, displaying on the first display 24C of the first terminal 24, or printing the same on a recording medium through a printing device connected to the virtual try-on apparatus 10 but not illustrated.

The output unit 12J may convert the bonus information or the URL received from the first server device 28 to an image indicative of a one-dimensional code or a two-dimensional code, and output the converted image. The two-dimensional code is a QR code (registered trademark), DataMatrix, Maxi-Code, or the like, for example. The output unit 12J may output both of the bonus information or URL and the one-dimensional code or two-dimensional code.

Upon reception of the first information from the second server device 32, the updater 12K registers the received first information in the storage 14, thereby to update the first information stored in the storage 14. That is, the first information registered in the storage 14 is updated by the first information distributed from the second server device 32.

Next, the first terminal 24 will be described. FIG. 6 is a functional block diagram of the first terminal 24.

The first terminal 24 includes an input unit 24A, a storage 24B, a first display 24C, and a controller 24D. The input unit 24A, the storage 24B, and the first display 24C are connected to the controller 24D so as to be capable of transmitting and receiving signals.

The first display 24C is a publicly-known display device that displays various images and others. In the embodiment, the first display 24C displays a list of images of clothing to be tried on such that the try-on subject can select the clothing.

The input unit 24A accepts input from the user. The input unit 24A is a device for the user to perform various input operations. The input unit 24A may be one of a mouse, a button, a remote control, a keyboard, a voice-recognition device such as a microphone, and an image-recognition device, or a combination thereof, for example.

In the embodiment, the input unit 24A accepts from the user input of the try-on subject ID, a selection of the image of clothing to be tried on, and various kinds of information for identifying the characteristic information on the try-on subject.

The input unit 24A and the first display 24C may be integrated. Specifically, the input unit 24A and the first display 24C may be formed as a UI (user interface) unit having both input and display capabilities. The UI unit may be a LCD (liquid crystal display) equipped with a touch panel or the like.

The storage 24B stores various data. In the embodiment, the storage 24B is not configured to store the first information. However, the storage 24B may be configured to store the first information as the storage 14 of the virtual try-on apparatus 10 is.

In this case, the following process is preferably performed at predetermined time intervals such that the storage 14 of the virtual try-on apparatus 10 and the storage 24B of the first terminal 24 store the same contents of the first information.

For example, it is preferred that the first information is distributed from the second server device 32 to the virtual try-on apparatus 10 and the first terminal 24 and a publicly-known mirroring process is performed between the virtual try-on apparatus 10 and the first terminal 24 at predetermined time intervals. The devices storing the first information (for example, the virtual try-on apparatus 10, the first terminal 24, and others) may acquire the latest first information from the second server device 32 for updating before execution of the various processes using the first information.

The controller 24D includes an acceptor 24E, a display controller 24F, and a communication unit 24G. Some or all of the acceptor 24E, the display controller 24F, and the communication unit 24G may be realized by causing a processing device such as a CPU, for example, to execute programs, that is, may be realized by software, or may be realized by hardware such as an IC, or may be realized by using software and hardware in combination.

The communication unit 24G is a communication interface that communicates with external devices such as the virtual try-on apparatus 10, the second terminal 26, and the third server device 30.

The acceptor 24E accepts an instruction for operation from the user through the input unit 24A. In the embodiment, the acceptor 24E accepts the try-on subject ID, the characteristic information, or various input items for identifying the characteristic information, the clothing ID of the image of clothing to be tried on, and the like from the input unit 24A.

The display controller 24F carries out control to display various images on the first display 24C. In the embodiment, the display controller 24F displays an acceptance screen, an input screen, a display screen, or the like on the first display 24C. The acceptance screen is a screen for accepting input of the try-on subject ID.

The input screen is a screen for allowing the try-on subject to input the input items for identifying the characteristic information. The input screen includes one or more questions to the try-on subject for identifying specific information on the try-on subject, for example. The questions specifically constitute a questionnaire for identifying the characteristic information on the try-on subject. The try-on subject inputs answers to the questions on the input screen using the input unit 24A. Accordingly, the acceptor 24E acquires the input answers from the try-on subject according to the input items for identifying the characteristic information.

In this case, the acceptor 24E identifies corresponding characteristic information according to sets of the answers from the try-on subject to the accepted one or more input items, thereby to accept the characteristic information. Specifically, the storage 24B stores in advance characteristic information corresponding to sets of answers to the one or more input items. Then, the acceptor 24E reads from the storage 24B the characteristic information corresponding to the set of answers accepted from the input unit 24A, thereby to accept the characteristic information.

The display screen is a screen containing a plurality of clothing images to allow the try-on subject to select the image of clothing to be tried on.

Figure 7:
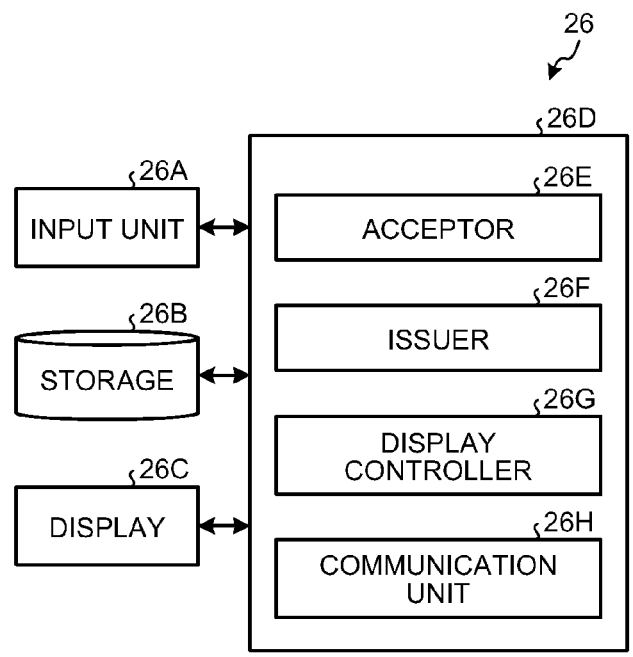
FIG. 7 is a functional block diagram of a second terminal.

Next, the second terminal 26 will be described. FIG. 7 is a functional block diagram of the second terminal 26.

The second terminal 26 includes an input unit 26A, a storage 26B, a display 26C, and a controller 26D. The input unit 26A, the storage 26B, and the display 26C are connected to the controller 26D so as to be capable of transmitting and receiving signals.

The display 26C is a publicly-known display device that displays various images and others. In the embodiment, the display 26C displays an operation screen on which the user providing services and products at the store A issues the try-on subject ID for a try-on subject having come to the store A, for example. The display 26C also displays a selection screen on which the try-on subject having come to the store A selects a combination of clothing to be virtually try-fitted.

The input unit 26A accepts input from the user. The input unit 26A is a device for the user to perform various input operations as the input unit 24A is.

The input unit 26A and the display 26C may be integrated. Specifically, the input unit 26A and the display 26C may be formed as an UI unit having both input and display capabilities.

The storage 26B stores various data. In the embodiment, the storage 26B stores try-on subject management information in which the try-on subject IDs are associated with attribute information on the try-on subjects (for example, names and others). The try-on subject management information is appropriately updated by the controller 26D.

The controller 26D includes an acceptor 26E, an issuer 26F, a display controller 26G, and a communication unit 26H. Some or all of the acceptor 26E, the issuer 26F, the display controller 26G, and the communication unit 26H may be realized by causing a processing device such as a CPU, for example, to execute programs, that is, may be realized by software, or may be realized by hardware such as an IC, or may be realized by using software and hardware in combination.

The communication unit 26H is a communication interface that communicates with external devices such as the virtual try-on apparatus 10 and the first terminal 24.

The acceptor 26E accepts an instruction for operation from the user through the input unit 26A. In the embodiment, the acceptor 26E accepts from the input unit 26A information on the selected combination of clothing to be tried on.

The issuer 26F issues the try-on subject ID for identifying the try-on subject. For example, the issuer 26F generates and issues a new try-on subject ID different from the try-on subject IDs stored in the try-on subject management information. The storage 26B stores in advance a list of numbers for lockers for storing baggage or the like installed at the store A (hereinafter, referred to as locker numbers). Then, the issuer 26F may issue a number for an unused locker out of the stored locker numbers, as a try-on subject ID. The try-on subject ID is not limited to the locker number as far as it allows identification of the try-on subject.

When receiving from the input unit 26A exit information including an exit instruction indicating that the try-on subject has exited out of the store A and the try-on subject ID issued for the try-on subject, the issuer 26F deletes the try-on subject ID contained in the exit information from the try-on subject management information. The exit information may be input by the user operating the input unit 26A, for example.

The display controller 26G performs control to display various images on the display 26C. In the embodiment, the display controller 26G performs control to display various images in the operation screen and the selection screen on the display 26C. The display controller 26G also displays the try-on subject ID issued by the issuer 26F on the display 26C. Accordingly, the user can check the issued try-on subject ID by viewing the display 26C.

Figure 8:
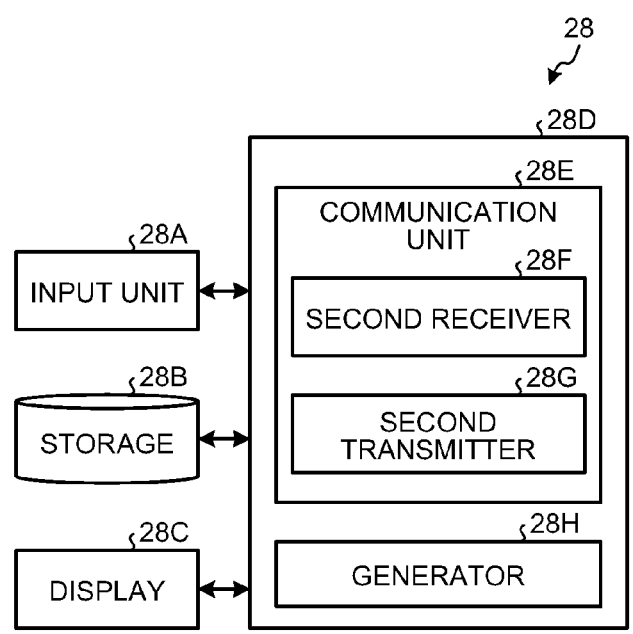
FIG. 8 is a functional block diagram of a first server device.

Next, the first server device 28 will be described. FIG. 8 is a functional block diagram of the first server device 28.

The first server device 28 includes an input unit 28A, a storage 28B, a display 28C, and a controller 28D. The input unit 28A, the storage 28B, and the display 28C are connected to the controller 28D so as to be capable of transmitting and receiving signals.

The display 28C is a publicly-known display device that displays various images and others. The input unit 28A accepts input from the user. The input unit 28A is a device for the user to perform various input operations as the input unit 24A is. The input unit 28A and the display 28C may be formed as a UI unit having both input and display capabilities.

The storage 28B stores various data. In the embodiment, the storage 28B stores third information in advance.

Figures 9, 10:
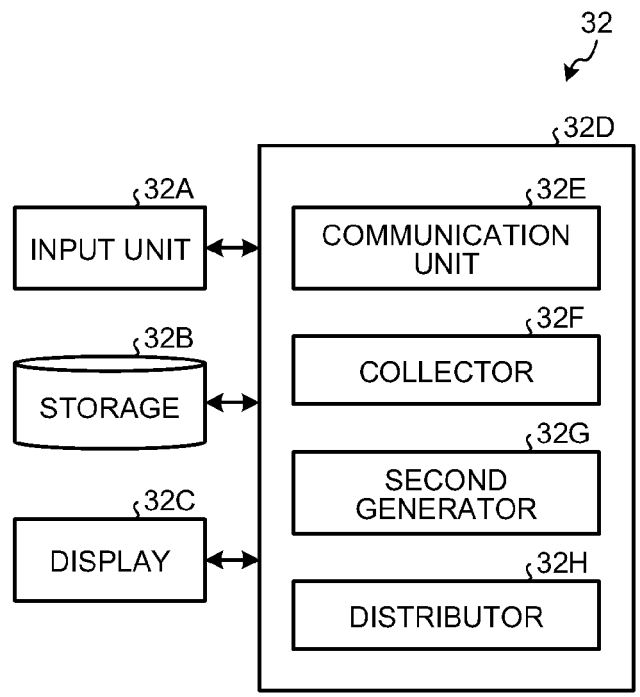
FIG. 9 is a diagram illustrating one example of a data structure of third information.
FIG. 10 is a functional block diagram of a second server device.

FIG. 9 is a diagram illustrating one example of a data structure of the third information. The third information associates the clothing IDs with attribute information.

The attribute information indicates attributes of clothing identified by the corresponding clothing ID. In the embodiment, the attribute information includes bonus information on the clothing identified by the corresponding clothing ID and information on a store selling the clothing identified by the corresponding clothing ID.

The bonus information is described above and thus will not be described here. The store information includes the place of the store of the clothing identified by the corresponding clothing ID, information on products provided at the store, information on various services provided at the store, and the like, for example. The place of the store refers to the place in real space (map information and the like), the URL of a web site of the store, and the like, for example.

The attribute information may be configured to further include the image of the clothing identified by the corresponding clothing ID. The attribute information may be configured to further include other information.

Returning to FIG. 8, the controller 28D includes a communication unit 28E and a generator 28H. Some or all of the communication unit 28E and the generator 28H may be realized by causing a processing device such as a CPU, for example, to execute programs, that is, may be realized by software, or may be realized by hardware such as an IC, or may be realized by using software and hardware in combination.

The communication unit 28E is a communication interface that communicates with an external device such as the virtual try-on apparatus 10. The communication unit 28E includes a second receiver 28F and a second transmitter 28G. The second receiver 28F receives various data from the external device. The second transmitter 28G transmits various data to the external device.

In the embodiment, the second receiver 28F receives try-on information from the virtual try-on apparatus 10. As described above, the try-on information includes the clothing ID of one or more pieces of clothing virtually tried on by the try-on subject, the try-on subject ID, and the image of the clothing identified by the clothing ID.

The generator 28H generates bonus information according to at least one of the clothing ID (first identification information) and the try-on subject ID (second identification information) included in the try-on information received by the second receiver 28F.

In the embodiment, the generator 28H reads from the third information the clothing image corresponding to the clothing ID included in the received try-on information and the attribute information corresponding to the clothing ID. Then, the generator 28H generates a web page containing the bonus information and the store information included in the read attribute information and the image of the clothing identified by the clothing ID included in the received try-on information, and stores the same in the storage 28B. Then, the second transmitter 28G transmits the URL indicating the stored place of the web page to the virtual try-on apparatus 10 as a source of the try-on information.

The generator 28H may transmit the bonus information to the virtual try-on apparatus 10.

Next, the second server device 32 will be described. FIG. 10 is a functional block diagram of the second server device 32.

The second server device 32 includes an input unit 32A, a storage 32B, a display 32C, and a controller 32D. The input unit 32A, the storage 32B, and the display 32C are connected to the controller 32D so as to be capable of transmitting and receiving signals.

The display 32C is a publicly-known display device that displays various images and others. The input unit 32A accepts input from the user. The input unit 32A is a device for the user to perform various input operations as the input unit 24A is. The input unit 32A and the display 32C may be formed as a UI unit having both input and display capabilities. The storage 32B stores various data.

The controller 32D includes a communication unit 32E, a collector 32F, a second generator 32G, and a distributor 32H. Some or all of the communication unit 32E, the collector 32F, the second generator 32G, and the distributor 32H may be realized by causing a processing device such as a CPU, for example, to execute programs, that is, may be realized by software, or may be realized by hardware such as an IC, or may be realized by using software and hardware in combination.

The communication unit 32E is an interface that communicates with external devices such as the virtual try-on apparatus 10, the second server device 32, the third server device 30, and various server devices connected to the Internet 36.

The collector 32F collects clothing images, attribute information corresponding to the clothing images, and the like from the various server devices connected to the Internet 36. The attribute information is described above and thus will not be described here. The collector 32F collects the clothing images and the attribute information by collecting information on the clothing images from the various server devices and the like connected to the Internet 36 at predetermined time intervals.

The second generator 32G uses the collected clothing images and attribute information to generate the first information. The first information generated by the second generator 32G is capable of being changed, edited, rewritten, and the like under instructions from the user (for example, the administrator of the second server device 32) operating the input unit 32A.

The second generator 32G also generates the third information (refer to FIG. 9) to associate the clothing IDs of the clothing in the collected clothing images with the collected attribute information.

The distributor 32H distributes the first information generated by the second generator 32G to the various external devices storing the first information or at least part of the first information via the communication unit 32E. The distributor 32H also distributes the generated third information to the first server device 28.

In the embodiment, the distributor 32H distributes the first information to the virtual try-on apparatus 10 and the first server device 28. The distributor 32H preferably distributes the first information and the third information only when the previously generated first information is updated at the second generator 32G.

At the virtual try-on apparatus 10, upon receipt of the first information distributed from the second server device 32, the updater 12K (refer to FIG. 3) stores the received first information in the storage 14. Accordingly, at the virtual try-on apparatus 10, the first information stored in the storage 14 is updated.

At the first server device 28, upon receipt of the third information distributed from the second server device 32, the controller 28D of the first server device 28 stores the received third information in the storage 28B. Accordingly, the first server device 28 updates the third information stored in the storage 28B.

When the storage 24B of the first terminal 24 is configured to store the first information, the distributor 32H further distributes the first information to the first terminal 24. The controller 24D of the first terminal 24 stores the received first information in the storage 24B to update the first information.

Figure 11:
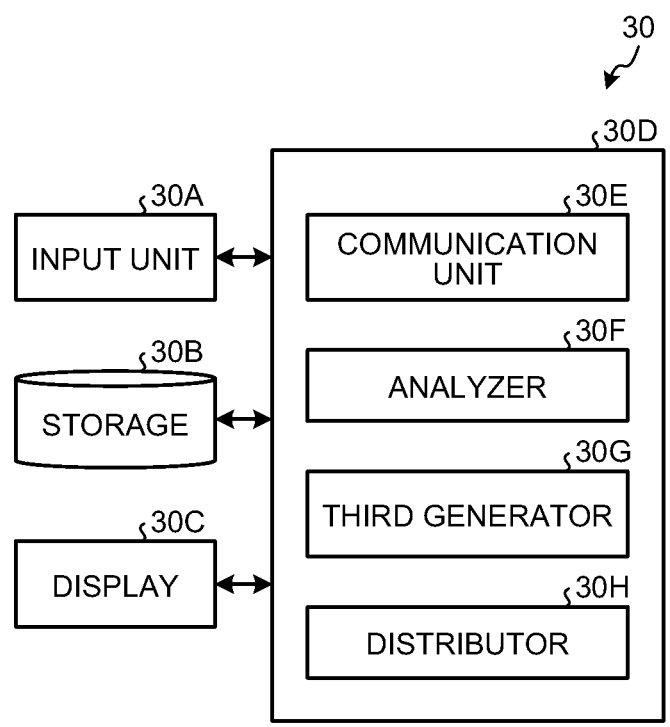
FIG. 11 is a functional block diagram of a third server device.

Next, the third server device 30 will be described. FIG. 11 is a functional block diagram of the third server device 30.

The third server device 30 includes an input unit 30A, a storage 30B, a display 30C, and a controller 30D. The input unit 30A, the storage 30B, and the display 30C are connected to the controller 30D so as to be capable of transmitting and receiving signals.

The display 30C is a publicly-known display device that displays various images and others. The input unit 30A accepts input from the user. The input unit 30A is a device for the user to perform various input operations as the input unit 24A is. The input unit 30A and the display 30C may be formed as a UI unit having both input and display capabilities. The storage 30B stores various data.

The controller 30D includes a communication unit 30E, an analyzer 30F, a third generator 30G, and a distributor 30H. Some or all of the communication unit 30E, the analyzer 30F, the third generator 30G, and the distributor 30H may be realized by causing a processing device such as a CPU, for example, to execute programs, that is, may be realized by software, or may be realized by hardware such as an IC, or may be realized by using software and hardware in combination.

The communication unit 30E is an interface that communicates with external devices such as the virtual try-on apparatus 10 and the first terminal 24. In the embodiment, the communication unit 30E receives try-on subject information from the first terminal 24 or the virtual try-on apparatus 10. The try-on subject information includes combination information including the clothing IDs of a plurality of images of clothing to be tried on selected by the try-on subject, the try-on subject ID, and the characteristic information on the try-on subject identified by the try-on subject ID. The try-on subject information may be configured to further include other information such as the combination ID.

The controller 30D associates the received try-on subject information with the reception date and time of the try-on subject information, and stores the same in sequence in the storage 30B.

The analyzer 30F uses the try-on subject information received by the communication unit 30E to search the various server devices connected to the Internet 36 and analyze information related to the try-on subject information.

For example, it is assumed that information to be capable of being uniquely identified on the Internet (for example, e-mail address, phone number, or the like) is used as the try-on subject ID. In this case, the analyzer 30F acquires the purchase history of the try-on subject corresponding to the try-on subject ID from another accessible server device or the storage 30B, and then analyzes the purchase information.

The analyzer 30F also acquires the same characteristic information as the characteristic information included in the received try-on subject information, the clothing images associated with other characteristic information similar to the characteristic information included in the try-on subject information, and the attribute information on the clothing in the clothing images, from another accessible server device or the storage 30B.

The other characteristic information similar to the characteristic information refers to other characteristic information in which at least one of the body shape parameters indicative of the body shape of the try-on subject, the characteristic color of the try-on subject, the age bracket in which the try-on subject resides, the try-on subject's personality, and the try-on subject's preferences included in the characteristic information in the try-on subject information, agrees with that in the characteristic information or falls within a predetermined range.

The analyzer 30F also acquires images of other clothing recommended at the store of the clothing identified by the clothing ID included in the try-on subject information, from an accessible server device or the storage 30B.

The third generator 30G generates a combination image recommended at the virtual try-on system 1 side, according to the received try-on subject information and results of the analysis by the analyzer 30F.

In the embodiment, the third generator 30G generates the recommended combination image indicated by a combination of a plurality of clothing images, according to a predetermined extraction condition, from the plurality of clothing images registered in the first information. The extraction condition is described above and thus will not be described below.

Alternatively, for example, the third generator 30G may store in advance the analysis results and the recommended combination image composed of the plurality of clothing IDs corresponding to the analysis results. The third generator 30G then reads the plurality of clothing IDs corresponding to the analysis results from the analyzer 30F. Then, the third generator 30G generates the recommended combination image from the clothing images corresponding to the plurality of read clothing IDs.

The distributor 30H distributes the recommended combination image generated by the third generator 30G via the communication unit 30E to the virtual try-on apparatus 10 or the first terminal 24 as a source of the try-on subject information.

Next, a procedure for a virtual try-on process executed in the virtual try-on system 1 will be described.

Figure 12:
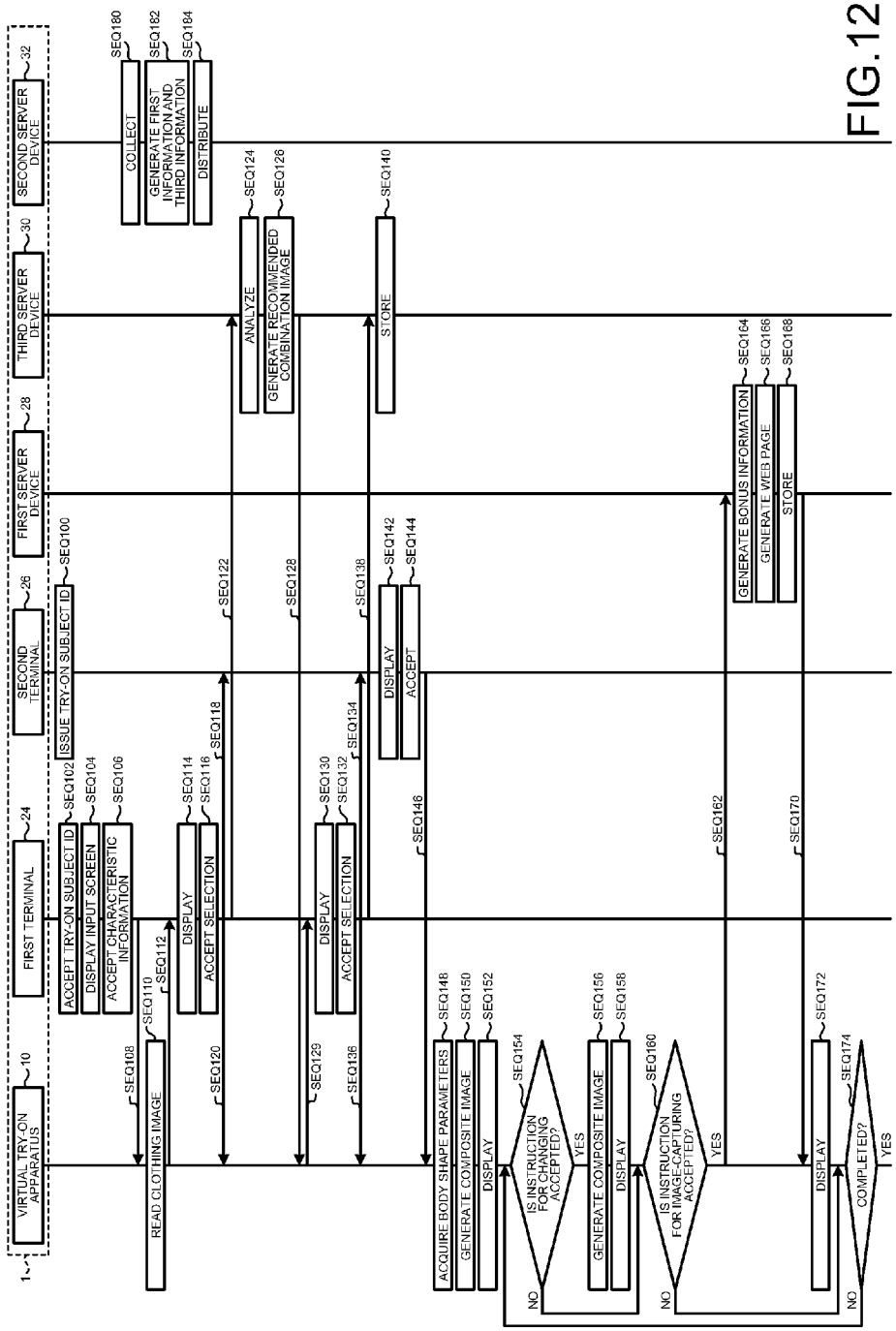
FIG. 12 is a sequence diagram illustrating a procedure for a virtual try-on process.

FIG. 12 is a sequence diagram illustrating the procedure for the virtual try-on process executed in the virtual try-on system 1.

First, the issuer 26F of the second terminal 26 issues the try-on subject ID (SEQ100). As described above, the display controller 26G displays the try-on subject ID issued by the issuer 26F on the display 26C. The user views the display 26C to check the try-on subject ID.

Next, the first terminal 24 accepts the try-on subject ID (SEQ102). The user operates the input unit 24A to input the try-on subject ID issued at SEQ100 via the acceptance screen displayed on the first display 24C. Accordingly, the acceptor 24E of the first terminal 24 accepts the try-on subject ID.

Next, the display controller 24F displays an input screen for inputting input items for identifying the characteristic information on the first display 24C (SEQ104). Alternatively, the display controller 24F may display an input screen for directly inputting the characteristic information on the first display 24C.

Next, the acceptor 24E accepts the characteristic information input by the try-on subject via the input screen (or identified from the answers to the input items) (SEQ106). Then, the communication unit 24G transmits the characteristic information to the virtual try-on apparatus 10 (SEQ108).

At the virtual try-on apparatus 10, the first acquisition unit 12A accepts the characteristic information. Then, the first display controller 12B reads the clothing images corresponding to the accepted characteristic information from the first information (SEQ110). Then, the first display controller 12B transmits the read clothing images to the first terminal 24 (SEQ112). At that time, the first display controller 12B may transmit the clothing images and the corresponding clothing ID to the first terminal 24.

The acceptor 24E of the first terminal 24 accepts the clothing images and the clothing ID from the virtual try-on apparatus 10. Then, the display controller 24F displays a display screen containing the accepted clothing images on the first display 24C (SEQ114).

By the steps SEQ106 to SEQ114, of the clothing images included in the first information, a list of the clothing images corresponding to the characteristic information on the try-on subject is displayed on the first display 24C. The try-on subject operates the input unit 24A to select one or more images of clothing to be tried on. In relation to the embodiment, descriptions will be given as to the case where, as the images of clothing to be tried on, the try-on subject selects images of a plurality of pieces of clothing to be tried on in combination.

Next, the acceptor 24E accepts the selection of the images of the plurality of pieces of clothing to be tried on in combination from the try-on subject (SEQ116). That is, the acceptor 24E accepts the selection of the images of the plurality of pieces of clothing to be tried on in combination by accepting an instruction for operation from the try-on subject through the input unit 24A.

Next, the communication unit 24G transmits to the second terminal 26 and the virtual try-on apparatus 10 the second information including the clothing IDs of the plurality of pieces of clothing to be tried on in combination selected by the try-on subject, the combination ID, the try-on subject ID accepted at SEQ102, the store ID, and the transmission date and time (SEQ118 and SEQ120). The combination ID only needs to allow identification of the combination of the plurality of corresponding clothing IDs. The virtual try-on apparatus 10 stores the accepted second information in the storage 14.

The communication unit 24G transmits the second information including the transmission date and time to the second terminal 26 and the virtual try-on apparatus 10 by including the transmission date and time of the second information in the second information. In addition, the communication unit 24G stores in advance the store ID of the store to which the second information is to be transmitted. Then, the communication unit 24G transmits the second information including the store ID to the second terminal 26 and the virtual try-on apparatus 10.

Next, the communication unit 24G transmits to the third server device 30 the try-on subject information including the combination information with the clothing IDs of the plurality of pieces of clothing to be tried on in combination, the try-on subject ID accepted at SEQ102, and the characteristic information accepted at SEQ106 (SEQ122).

The communication unit 30E of the third server device 30 receives the try-on subject information from the first terminal 24. Alternatively, the communication unit 30E may receive the try-on subject information from the virtual try-on apparatus 10. In this case, the communication unit 12G of the virtual try-on apparatus 10 transmits the try-on subject information received at SEQ120 to the third server device 30.

The controller 30D of the third server device 30 sequentially stores in the storage 30B the received try-on subject information in association with the reception date and time of the try-on subject information. Accordingly, the try-on subject information can be effectively used in the next analysis process. Then, the analyzer 30F analyzes information related to the received try-on subject information (SEQ124).

Next, the third generator 30G generates recommended combination images as recommendations from the virtual try-on system 1 side, based on the try-on subject information and the analysis results (SEQ126).

Then, the distributor 30H transmits the recommended combination images to the virtual try-on apparatus 10 (SEQ128). Alternatively, the distributor 30H may transmit the recommended combination images to the first terminal 24.

At the virtual try-on apparatus 10, the communication unit 12G receives the recommended combination images and the first display controller 12B transmits the recommended combination images to the first terminal 24 (SEQ129). When the acceptor 24E of the first terminal 24 accepts the recommended combination images, the display controller 24F displays the recommended combination images on the first display 24C (SEQ130).

By the steps SEQ122 to SEQ130, the recommended combination images represented by the combinations of the clothing images recommended at the virtual try-on system 1 side are displayed on the first display 24C.

Next, the acceptor 24E accepts from the try-on subject a selection of a recommended combination image (SEQ132). Specifically, the acceptor 24E accepts an instruction for operation by the try-on subject through the input unit 24A to accept the selection of one of the recommended combination images.

Next, the communication unit 24G transmits to the second terminal 26 and the virtual try-on apparatus 10 the second information including the clothing IDs of the plurality of pieces of clothing to be tried on in combination selected by the try-on subject at SEQ132, the combination ID, the try-on subject ID accepted at SEQ102, the store ID, and the transmission date and time (SEQ134 and SEQ136). The virtual try-on apparatus 10 stores the accepted second information in the storage 14.

Next, the communication unit 24G transmits to the third server device 30 the try-on subject information including the combination information with the clothing IDs of the plurality of pieces of clothing to be tried on in combination selected by the try-on subject at SEQ132, the try-on subject ID accepted at SEQ102, and the characteristic information accepted at SEQ106 (SEQ138).

The communication unit 30E of the third server device 30 receives the try-on subject information from the first terminal 24. The controller 30D sequentially stores in the storage 30B the received try-on subject information in association with the reception date and time of the try-on subject information (SEQ140). Accordingly, the try-on subject information can be effectively used in the next analysis process.

Meanwhile, at the second terminal 26 having received the second information by the processes at SEQ118 and SEQ134, the display controller 26G displays on the display 26C a selection screen in which each piece of the received second information is individually provided in a selectable manner (SEQ142).

Figure 13:
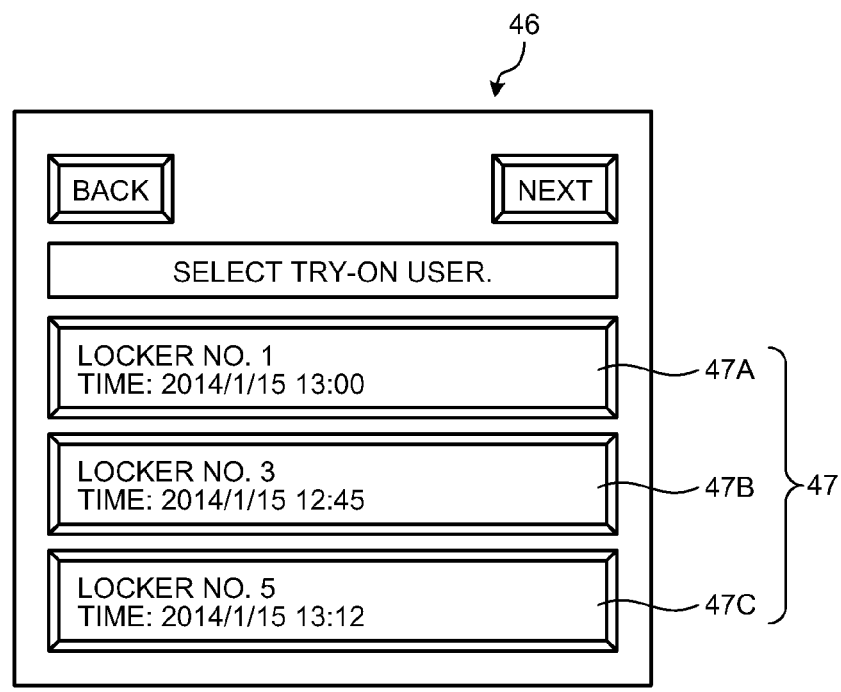
FIG. 13 is a diagram illustrating one example of a selection screen.

FIG. 13 is a diagram illustrating one example of a selection screen 46. The selection screen 46 contains button images 47 (47A to 47C) describing each piece of the second information, for example. Each of the button images 47 includes characters indicative of at least part of the corresponding second information, for example. In the example of FIG. 13, the button images 47 include the try-on subject ID (in FIG. 13, locker number 1, locker number 3, or locker number 5) and the transmission date and time in the second information.

Returning to FIG. 12, the acceptor 26E accepts from the try-on subject through the input unit 26A a selection of the second information corresponding to the combination of images of clothing to be tried on from the one or more pieces of the second information displayed on the selection screen 46 (SEQ144). That is, the user (for example, the try-on subject or the service provider at the store A) operates the input unit 26A to input the button image 47 of the second information corresponding to the try-on ID of the try-on subject. Accordingly, the acceptor 26E accepts from the try-on subject the selection of the second information corresponding to the combination of images of clothing to be tried on.

Next, the communication unit 26H transmits the second information accepted at SEQ144 to the virtual try-on apparatus 10 (SEQ146).

The communication unit 12G of the virtual try-on apparatus 10 receives the second information from the second terminal 26. Then, the second acquisition unit 12F of the virtual try-on apparatus 10 acquires the body shape parameters indicative of the body shape of the try-on subject (SEQ148).

Next, the generator 12D generates a composite image of the try-on subject image shot by the first image-capturing unit 20A and the clothing images corresponding to the clothing IDs in the second information (refer to FIG. 5) received at SEQ146 (SEQ150).

Next, the second display controller 12E displays the composite image generated at SEQ150 on the second display 18 (SEQ152).

Figure 14:
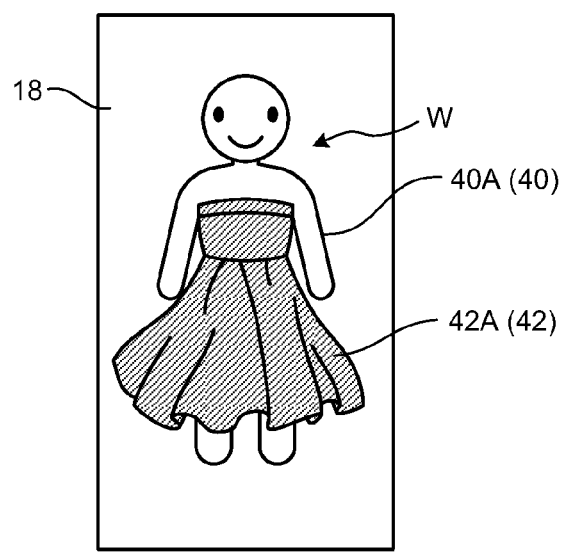
FIG. 14 is a diagram illustrating one example of a composite image.

FIG. 14 is a diagram illustrating one example of a composite image W displayed on the second display 18. For the simplification of description, FIG. 14 presents the composite image W in which one clothing image 42A is superimposed on a try-on subject image 40A. The image-capturing unit 20 continuously shoots images. While the composite image is displayed at SEQ152, the generator 12D repeatedly executes the process for generating a composite image by combining the subject image continuously shot by the image-capturing unit 20 with the clothing images corresponding to the clothing IDs in the second information (refer to FIG. 5) received at SEQ146 and corresponding to the posture information calculated from the depth map obtained by the shooting. Then, each time a new composite image is generated by the generator 12D, the second display controller 12E switches the composite images to be displayed on the second display 18. Accordingly, displayed on the second display 18 is a composite image in which the clothing images are superimposed on the subject image as a mirror image of the subject facing the second display 18, according to the posture of the subject.

Returning to FIG. 12, the acceptor 12C then determines whether an instruction for changing the composite images has been accepted (SEQ154). In the embodiment, the acceptor 12C accepts the gestures of the try-on subject facing the second display 18 as various instructions from the try-on subject. For example, the acceptor 12C registers in advance the try-on subject's motion of raising the right hand as an instruction for changing the composite images. The acceptor 12C analyzes by a publicly-known method the try-on subject image shot by the first image-capturing unit 20A or the depth map shot by the second image-capturing unit 20B. When determining from the analysis that the try-on subject has made the motion of raising the right hand, the acceptor 12C judges that the instruction for changing the composite images has been accepted.

When it is determined that the try-on subject has made the motion of raising the right hand, the second display controller 12E may display on the second display 18 an instruction image indicative of an instruction corresponding to the motion. Specifically, when it is determined the try-on subject has made the motion of raising the right hand, the second display controller 12E may display on the second display 18 an instruction image indicative of the instruction for changing the composite images (for example, a character string or an image indicating "To next coordinates").

Figure 15A:
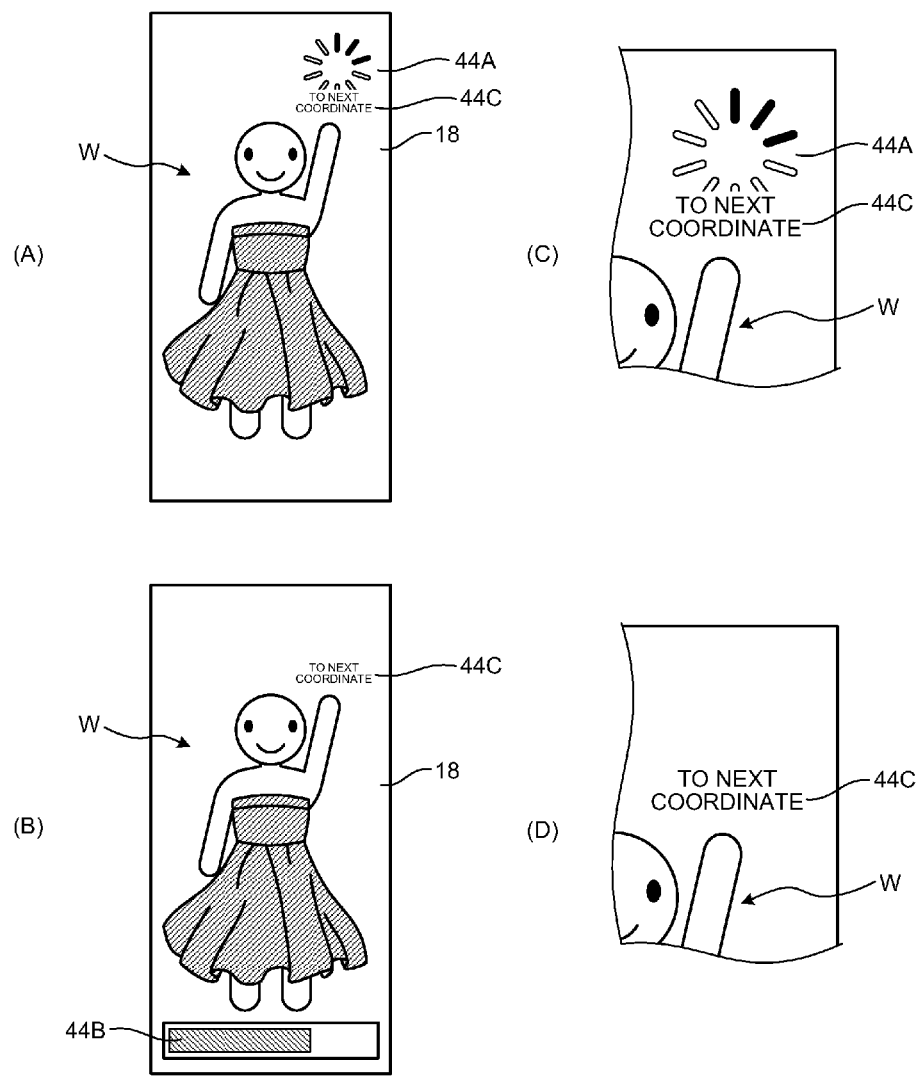
FIG. 15A illustrates examples of a remaining time indication.

In particular, the instruction image is superimposed on the try-on subject image in the vicinity of the try-on subject's right hand for the display (refer to an instruction image 44C illustrated in (A) to (D) in FIG. 15A. In FIG. 15A, (C) is an enlarged partial view of (A), and (D) is an enlarged partial view of (B).

As described above, in the embodiment, the generator 12D generates a composite image by placing the selected clothing image (corrected image) on a mirror image of the try-on subject image such that the try-on subject facing the second display 18 can check the composite image as if the try-on subject looks in a mirror. Accordingly, in FIGS. 15A and 15B described later, the try-on subject's left hand in the image is actually the try-on subject's right hand.

When an affirmative determination is made at SEQ154 (SEQ154: Yes), the generator 12D searches the storage 14 for other second information including the try-on subject ID in the second information corresponding to the composite image previously displayed on the second display 18, and reads one piece of the second information not displayed in any composite image. Then, the generator 12D uses the read second information to generate a composite image in the same manner as at SEQ150 (SEQ156).

During the generation of the composite image, that is, during the change of the composite images, it is preferred that first time information indicative of the remaining time before display of the changed composite image is provided on the second display 18. FIG. 15A illustrates examples of a remaining time indication.

Upon receipt of the instruction for changing the composite images, as illustrated in FIG. 15A, the second display controller 12E preferably displays first time information 44A indicative of the remaining time before display of the changed composite image on the second display 18. The first time information 44A is composed of an image including numbers or a circular gauge indicative of the remaining time, for example. Preferably, the pre-changed composite information W is displayed on the second display 18 until the display of the post-changed composite image. The first time information 44A may represent a predetermined time or a time calculated as a time required before the display of the changed composite image.

The first time information indicative of the remaining time may be displayed in any form to allow visual recognition of the remaining time. For example, as illustrated in (B) in FIG. 15A, first time information 44B indicative of the remaining time may be provided as a bar gauge indicative of the remaining time. Accordingly, the controller 12 can provide the try-on subject with the instruction image describing the message "To next coordinates" and a gauge as the first time information indicative of the remaining time in a viewable manner. Then, when the gauge indicative of the remaining time becomes full (the remaining time is "0"), the controller 12 can display the changed composite image on the second display 18. The second display controller 12E may display on the second display 18 the composite image with at least one of the instruction image and the first time information indicative of the remaining time before completion of the process corresponding to the instruction (in the foregoing example, the remaining time before the display of the changed composite image), or may display on the second display 18 the composite image with both of them.

Returning to FIG. 12, the second display controller 12E displays the composite image generated at SEQ156 on the second display 18 (SEQ158). The image-capturing unit 20 continuously shoots images. While the composite image is displayed at SEQ158, the generator 12D repeatedly executes the process for generating a composite image by combining the subject image continuously shot by the image-capturing unit 20 with the clothing images corresponding to the clothing IDs in the second information read at SEQ156 and corresponding to the posture information calculated from the depth map obtained by the shooting. Then, each time a new composite image is generated by the generator 12D, the second display controller 12E switches the composite images to be displayed on the second display 18. Accordingly, displayed on the second display 18 is a composite image in which the clothing images are superimposed on the subject image as a mirror image of the subject facing the second display 18, according to the posture of the subject.

Upon the display of the composite image, the second display controller 12E may delete the second information corresponding to the displayed composite image from the storage 14. In addition, the second display controller 12E may transmit to the second terminal 26 an instruction for deletion of the second information corresponding to the displayed composite image. Upon receipt of the instruction for deletion, the second terminal 26 deletes the second information specified by the received instruction for deletion from the storage 26B. Accordingly, the selection screen on the display 26C of the second terminal 26 for selecting combination information of clothing to be tried on, presents only the clothing images not used in any composite image.

When an instruction for changing the orders of superimposing the clothing images in the composite image is issued from the try-on subject operating an input unit or the like not illustrated, the generator 12D may generate a composite image again according to the instructed order of layers. Then, the second display controller 12E displays the generated composite image on the second display 18. It may be determined whether the instruction for changing the orders of layers may be made depending on whether the try-on subject has made a predetermined motion, as in the case described above.

Meanwhile, when a negative determination is made at SEQ154 (SEQ154: No), the process moves to SEQ160.

Next, the acceptor 12C determines whether an instruction for image capturing has been accepted (SEQ160). In the embodiment, the acceptor 12C accepts the gestures of the try-on subject facing the second display 18 as various instructions from the try-on subject. For example, the acceptor 12C registers in advance the try-on subject's motion of raising the left hand as an instruction for image capturing. The acceptor 12C analyzes by a publicly-known method the try-on subject image shot by the first image-capturing unit 20A or the depth map shot by the second image-capturing unit 20B. When determining that the try-on subject has made the motion of raising the left hand, the acceptor 12C judges that the instruction for image capturing has been accepted.

When it is determined that the try-on subject has made the motion of raising the left hand, the second display controller 12E may display on the second display 18 an instruction image indicative of an instruction corresponding to the motion. Specifically, when it is determined that the try-on subject has made the motion of raising the left hand, the second display controller 12E may display on the second display 18 an instruction image indicative of an instruction for image capturing the composite image (for example, character strings or an image describing the message "Shooting"). In particular, the instruction image is superimposed on the try-on subject image in the vicinity of the try-on subject's left hand for the display. In addition, as in the case described above, the second display controller 12E may further display the remaining time.

Figure 15B:
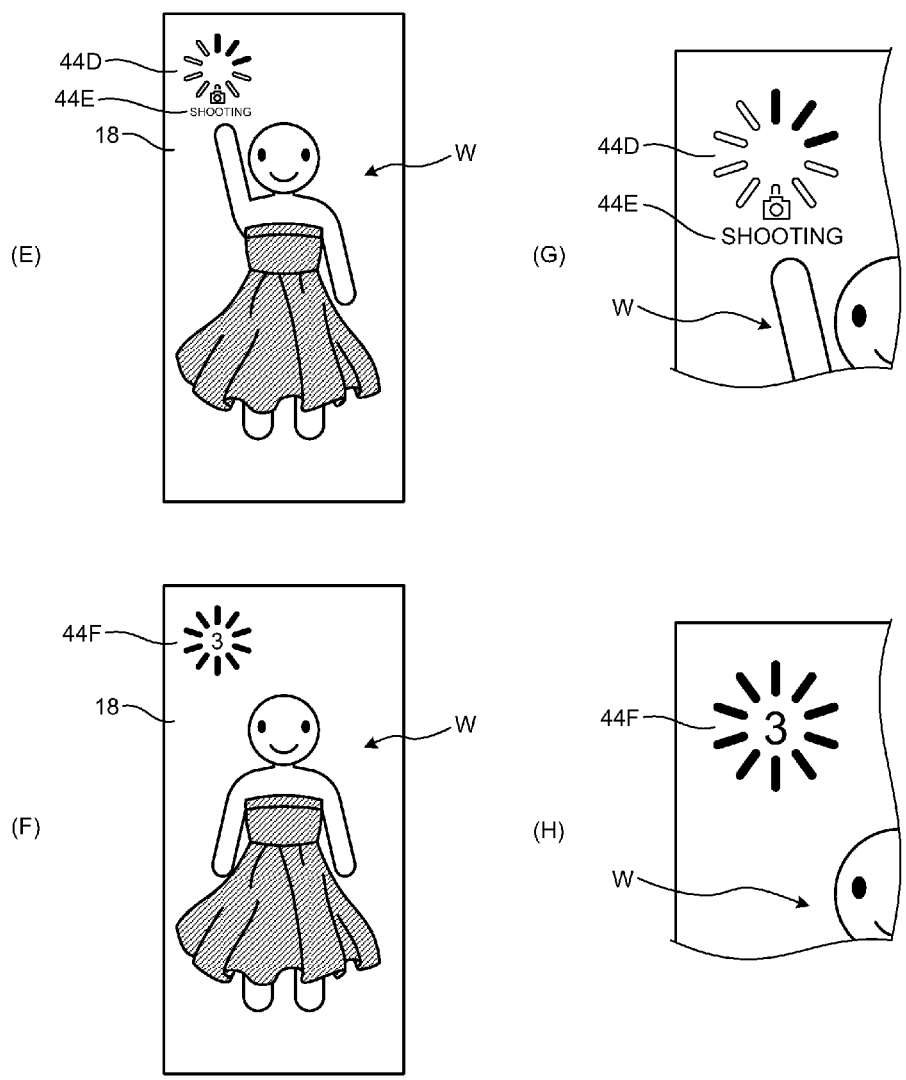
FIG. 15B illustrates examples of a remaining time indication.

FIG. 15B illustrates examples of a remaining time indication including an instruction image indicative of an instruction for image capturing. For example, when determining that the try-on subject has made the motion of raising the left hand, the acceptor 12C accepts the instruction for capturing the composite image displayed on the second display 18. Then, the second display controller 12E displays on the second display 18 the composite image with at least one of the instruction image and second time information indicative of the remaining time before confirmation of the instruction for image capturing. For example, as illustrated in (E) and (G) in FIG. 15B, the second display controller 12E displays on the second display 18 a composite image W including at least one of second time information 44D indicative of the remaining time before conformation of the instruction for image capturing and an instruction image 44E. The second time information 44D is composed of an image with numbers or a gauge (circular gage or bar gauge) indicating the remaining time. Accordingly, during the period of time indicated by the second time information, the try-on subject can cancel the instruction for image capturing or issue another instruction. In FIG. 15B, (G) is an enlarged partial view of (E).

Then, after a lapse of the remaining time indicated by the second time information, the second display controller 12E displays on the second display 18 the composite image with at least one of the instruction image (in the example, the character strings or the image describing the message "Shooting") and third time information 44F indicative of the remaining time before execution of the process according to the instruction for image capturing (refer to (F) and (H) in FIG. 15B). In FIG. 15B, (H) is an enlarged partial view of (F). Accordingly, the try-on subject can change his/her posture by dropping the arm or the like during the period of time indicated by the third time information 44F.

While the first time information, the second time information, or the third time information is displayed on the second display 18, when determining that the try-on subject has made the motion of moving his/her hand or arm in the lateral direction (rightward or leftward), the acceptor 12C may judge that the various instructions for change have been accepted from the try-on subject. The try-on subject's motion is judged from the depth map or the try-on subject image in the same manner as described above. For example, when determining that the try-on subject has made the motion in the lateral direction, the acceptor 12C may judge that an instruction for changing from "instruction for changing the composite images" to "instruction for image capturing" has been accepted, or an instruction for changing from "instruction for shooting" to "instruction for changing the composite images" has been accepted. Then, the controller 12 executes the process corresponding to the changed instruction.

When a negative determination is made at SEQ160 (SEQ160: No), the process moves to SEQ174 described later. When an affirmative determination is made at SEQ160 (SEQ160: Yes), the process moves to SEQ162. At SEQ162, the first transmitter 12H transmits try-on subject information to the first server device 28 (SEQ162). The try-on subject information includes the clothing IDs of the images of the one or more pieces of clothing in the previously displayed composite image, the try-on subject ID of the try-on subject image in the composite image, and the images of the clothing identified by the clothing IDs. That is, the first transmitter 12H transmits to the first server device 28 the foregoing try-on information relating to the composite image displayed on the second display 18, after a lapse of the remaining time indicated by the third time information.

The second receiver 28F of the first server device 28 receives the try-on information from the virtual try-on apparatus 10. Then, the generator 28H generates bonus information corresponding to at least one of the clothing IDs (first identification information) and the try-on subject ID (second identification information) included in the try-on information received by the second receiver 28F (SEQ164).

Next, the generator 28H reads from the third information the clothing images corresponding to the clothing IDs included in the received try-on information and the attribute information corresponding to the clothing IDs. Then, the generator 28H generates a web page containing the bonus information and store information included in the read attribute information and the images of the clothing identified by the clothing IDs included in the received try-on information, and stores the same in the storage 28B (SEQ166 and SEQ168).

Next, the second transmitter 28G transmits the URL indicative of the stored place of the web page to the virtual try-on apparatus 10 (SEQ170).

At the virtual try-on apparatus 10, the URL is received from the first server device 28. Accordingly, the output unit 12J of the virtual try-on apparatus 10 converts the URL received from the first server device 28 into an image describing a one-dimensional code or a two-dimensional code, and outputs the same to the second display 18 (SEQ172).

The try-on subject can read the one-dimensional code or two-dimensional code displayed on the second display 18 into his/her mobile terminal to easily access the generated web page from the mobile terminal. In addition, the try-on subject can view the web page to easily check the images of the tried-on clothing and the attribute information corresponding to the clothing images.

The one-dimensional code or two-dimensional code displayed on the second display 18 indicates the bonus information. In this case, the try-on subject can display the bonus information on the display of his/her mobile terminal or the like to receive a service corresponding to the bonus information at the store of the tried-on clothing or the like. In addition, the try-on subject can print the bonus information on a paper medium to receive a service corresponding to the bonus information at the store of the clothing or the like.

Next, the acceptor 12C determines whether an instruction for termination of virtual try-on has been accepted (SEQ174). For example, the acceptor 12C may determine whether an instruction for termination of virtual try-on has been accepted depending on whether a signal indicative of the instruction for termination has been received from an input unit or an external device not illustrated. Alternatively, the acceptor 12C may judge that the instruction for termination of virtual try-on has been accepted when determining that the try-on subject has made a predetermined motion indicating the instruction for termination.

When a negative determination is made at SEQ174 (SEQ174: No), the process returns to SEQ154. Meanwhile, when an affirmative determination is made at SEQ174 (SEQ174: Yes), the process is terminated.

The second server device 32 executes the following process at predetermined time intervals.

First, the collector 32F collects clothing images and attribute information corresponding to the clothing images from various server devices and others connected to the Internet 36 at predetermined time intervals (SEQ180).

Next, the second generator 32G uses the collected clothing images and attribute information to generate the first information (refer to FIG. 4) and the third information (refer to FIG. 9) (SEQ182).

The distributor 32H distributes the first information to the virtual try-on apparatus 10 and the first server device 28 (SEQ184). The distributor 32H also transmits the third information to the first server device 28 (SEQ184).

At the virtual try-on apparatus 10, upon receipt of the first information distributed from the second server device 32, the updater 12K (refer to FIG. 3) stores the received first information in the storage 14 to update the first information stored in the storage 14.

At the first server device 28, upon receipt of the third information distributed from the second server device 32, the controller 28D of the first server device 28 stores the received third information in the storage 28B to update the third information stored in the storage 28B.

As described above, the virtual try-on apparatus 10 of the embodiment includes the first acquisition unit 12A, the first display controller 12B, the acceptor 12C, the generator 12D, and the second display controller 12E. The first acquisition unit 12A acquires the characteristic information on the try-on subject. The first display controller 12B displays on the first display 24C the clothing images corresponding to the acquired characteristic information in the first information having at least associations between the characteristic information and the clothing images. The acceptor 12C accepts from the try-on subject a selection of the image of clothing to be tried on from among the clothing images displayed on the first display 24C. The generator 12D generates a composite image of the try-on subject image and the selected clothing image. The second display controller 12E displays the composite image on the second display 18.

As described above, at the virtual try-on apparatus 10 of the embodiment, for selection of the image of clothing to be tried on by the try-on subject, the clothing images according to the characteristic information on the try-on subject are displayed. This allows the try-on subject to select the image of clothing to be tried on from among the clothing images according to the characteristic information on the try-on subject.

Therefore, the virtual try-on apparatus 10 of the embodiment makes it possible to provide a virtual try-on service suited for each try-on subject.

In addition, when the virtual try-on apparatus 10 is installed in a pre-decided area such as a store or the like, a try-on subject as a customer can input his/her characteristic information and select the image of clothing to be tried on during a waiting time at the store, and then after a lapse of the waiting time, the try-on subject can enjoy the virtual try-on.

Specifically, it is assumed that the virtual try-on apparatus 10 is installed in a beauty salon as the store. In this case, a try-on subject as a customer having come to the beauty salon inputs his/her characteristic information and selects the image of clothing to be tried on via the first terminal 24 during a waiting time. Then, after the try-on subject receives a service such as hair coloring provided at the beauty salon, the try-on subject stands and faces the second display 18 of the virtual try-on apparatus 10 and then selects desired second information. Accordingly, the try-on subject can check on the second display 18 a composite image of the image of the try-on subject after the hair coloring and the image of the clothing to be tried on selected in advance.

The first information includes all the clothing images distributed from the second server device 32 regardless of the stores and brands of the clothing. The first display controller 12B of the virtual try-on apparatus 10 displays on the first display 24C the clothing images corresponding to the characteristic information on the try-on subject in the first information.

Accordingly, the try-on subject can select the image of the clothing to be tried on from among the clothing images corresponding to the characteristic information on the try-on subject out of all the clothing images managed at the virtual try-on system 1 or the virtual try-on apparatus 10, without any limitation on the particular brands or stores of the clothing.

The first display controller 12B also displays on the first display 24C the recommended combination image indicated by a combination of a plurality of clothing images extracted under a pre-decided extraction condition. Accordingly, besides the foregoing advantages, the virtual try-on apparatus 10 of the embodiment can easily provide the try-on subject with information for sales promotion of clothing.

The first transmitter 12H of the virtual try-on apparatus 10 transmits to the first server device 28 connected via the network the try-on information including the clothing ID for identifying the image of the clothing to be tried on (first identification information) and the try-on subject ID of the try-on subject to try-on the clothing in the clothing images (second identification information). The first receiver 12I receives from the first server device 28 the bonus information according to at least one of the clothing ID and the try-on subject ID.

The second receiver 28F of the first server device 28 receives the try-on information from the virtual try-on apparatus 10. The generator 28H generates the bonus information according to at least one of the clothing ID and the try-on subject ID included in the received try-on information. The second transmitter 28G transmits the bonus information to the virtual try-on apparatus 10.

Accordingly, the virtual try-on apparatus 10 and the virtual try-on system 1 of the embodiment can easily provide the images of the clothing tried on by the try-on subject and the bonus information according to the characteristic information on the try-on subject. In addition, the virtual try-on apparatus 10 and the virtual try-on system 1 can easily provide the bonus information for guiding the try-on subject to the real stores and virtual stores of the clothing, and thus can easily provide information for sales promotion of clothing.

Therefore, the virtual try-on apparatus 10 and the virtual try-on system 1 of the embodiment can provide a virtual try-on service suited for each try-on subject.

The collector 32F of the second server device 32 collects the clothing images and the attribute information corresponding to the clothing images at predetermined time intervals, from various server devices and others connected to the Internet 36. The second generator 32G uses the collected clothing images and attribute information to generate the first information (refer to FIG. 4) and the third information (refer to FIG. 9). The distributor 32H distributes the generated first information and third information to the virtual try-on apparatus 10 and the first server device 28.

Accordingly, the virtual try-on apparatus 10 and the first server device 28 can use the latest clothing images to execute the foregoing various processes.

In the embodiment, the various processes such as reading of the clothing images corresponding to the characteristic information, acquisition of the body shape parameters, and generation of the composite image, are executed at the virtual try-on apparatus 10. Alternatively, these processes may be executed at the first terminal 24. In this case, the functional units of the controller 12 in the virtual try-on apparatus 10 are provided in the controller 24D of the first terminal 24.

In addition, in this case, the first terminal 24 may acquire the body shape parameters from the virtual try-on apparatus 10 or the input unit 24A of the first terminal 24.

When the first terminal 24 can execute the processes to be executed at the virtual try-on apparatus 10, the try-on subject can perform virtual try-on even outside in the pre-decided area (for example, at the try-on subject's home) or any other place.

In the embodiment, the first terminal 24 is a terminal used in a pre-decided area such as a store or the like. Alternatively, the first terminal 24 may be a try-on subject's mobile terminal.

Second Embodiment

In the embodiment, the number or the kinds of clothing images to be displayed for selection of the image of clothing to be tried on is adjusted depending on a scheduled waiting time for the try-on subject as described below.

FIG. 1 is a schematic view of a virtual try-on system 1A in the embodiment.

The virtual try-on system 1A includes a virtual try-on apparatus 10A, a first terminal 24, a second terminal 26, a first server device 28, a third server device 30, and a second server device 32. The virtual try-on apparatus 10A, the first terminal 24, the second terminal 26, the first server device 28, the third server device 30, and the second server device 32 are connected together via a publicly-known communication network such as the Internet.

The virtual try-on system 1A is configured in the same manner as the virtual try-on system 1 in the first embodiment except that the virtual try-on apparatus 10A is provided instead of the virtual try-on apparatus 10.

The virtual try-on apparatus 10A includes a controller 13, a storage 14A, and a main body unit 16. The main body unit 16 includes an image-capturing unit 20, a second display 18, and an illuminator 22. The main body unit 16 is the same as that of the first embodiment. The storage 14A, the controller 13, and the main body unit 16 are connected together so as to be capable of transmitting and receiving signals.

Figure 16:
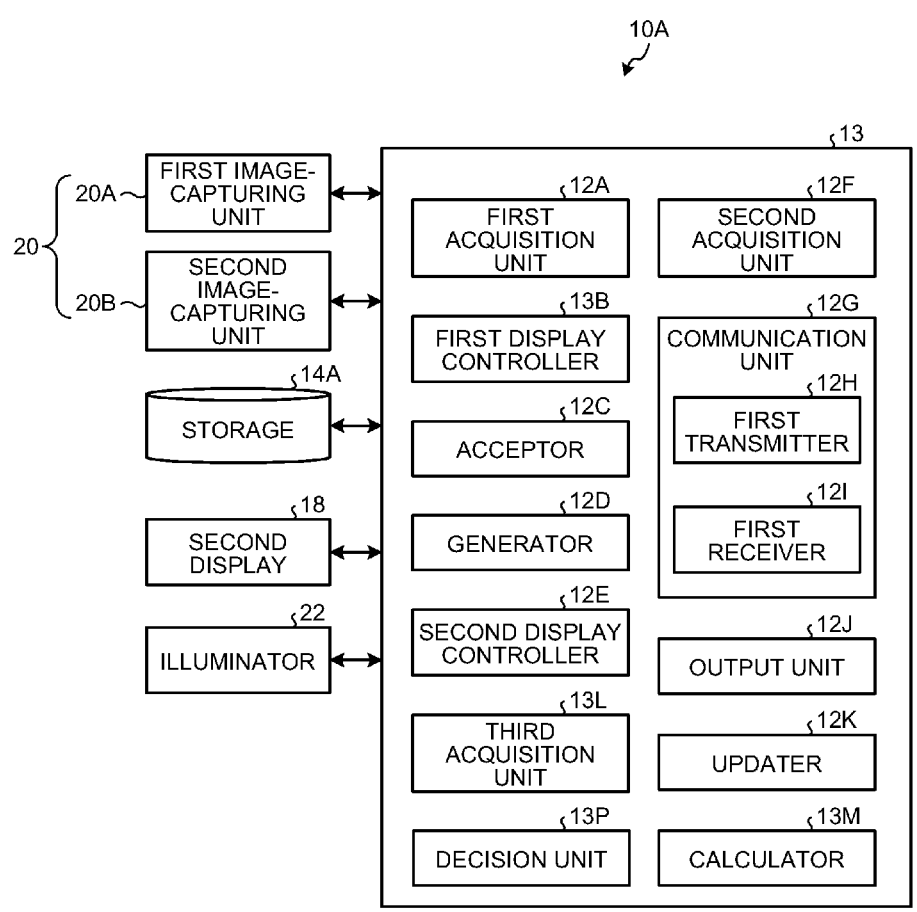
FIG. 16 is a functional block diagram of a virtual try-on apparatus.

FIG. 16 is a functional block diagram of the virtual try-on apparatus 10A.

The storage 14A is a publicly-known hard disc device. The storage 14A stores various data. In the embodiment, the storage 14A stores various data such as first information, second information, and fourth information. The first information and the second information are the same as those in the first embodiment.

The fourth information associates relationships between a predicted time and a scheduled waiting time with display conditions. FIG. 17 is a diagram illustrating one example of a data structure of the fourth information.

The predicted time indicates a presumed time necessary for the try-on subject to select clothing to be tried on from among a plurality of clothing images displayed on the first display 24C. The predicted time is calculated by the controller 13 (described later in detail).

The scheduled waiting time indicates a scheduled waiting time before the try-on subject can receive a service in an area such as a store where the virtual try-on apparatus 10A is installed. The scheduled waiting time is acquired by the controller 13 (described later in detail).

The display condition refers to a condition for display of clothing images on the first display 24C in a selectable manner. In the embodiment, the display condition is at least one of the number of clothing images to be displayed on the first display 24C and the kinds of clothing images to be displayed on the first display 24C, such that at least one of the kinds and the number of clothing images to be displayed on the first display 24C decreases as the predicted time is longer relative to the scheduled waiting time.

In the example of FIG. 17, the relationship "ts<tw" between a predicted time ts and a scheduled waiting time tw is associated with at least one of "M1 clothing images" and "all S1 kinds of clothing" as a display condition. The relationship "tw<ts<2tw" between the predicted time ts and the scheduled waiting time tw is associated with at least one of "M2 clothing images" and "S2 kinds of clothing out of all the kinds of clothing" as a display condition. The relationship "2tw<ts<3tw" between the predicted time ts and the scheduled waiting time tw is associated with at least one of "M3 clothing images" and "S3 kinds of clothing out of all the kinds of clothing" as a display condition. The relationship "3tw<ts" between the predicted time ts and the scheduled waiting time tw is associated with at least one of "M4 clothing images" and "S4 kinds of clothing out of all the kinds of clothing" as a display condition.

Each of the numbers M1, M2, M3, and M4 denotes an integer of 1 or more, and is in the relationship M1>M2>M3>M4. Each of the numbers S1, S2, S3, and S4 denotes an integer of 1 or more, and is in the relationship S1>S2>S3>S4.

The kinds of clothing may include tops, bottoms, outers, inners, and others as described above in relation to the first embodiment, for example.

The number or the kinds of clothing images as a display condition may be adjusted in advance such that the try-on subject can select a combination of images of at least one kind of clothing to be tried on in combination, within the scheduled waiting time. The combination of images of at least one kind of clothing refers to a combination of images of one each piece of clothing selected in each of kinds such as tops, bottoms, and outers, for example.

Returning to FIG. 16, the controller 13 includes a first acquisition unit 12A, a first display controller 13B, an acceptor 12C, a generator 12D, a second display controller 12E, a second acquisition unit 12F, a communication unit 12G (first transmitter 12H and first receiver 12I), an output unit 12J, an updater 12K, a third acquisition unit 13L, a calculator 13M, and a decision unit 13P.

Some or all of the first acquisition unit 12A, the first display controller 13B, the acceptor 12C, the generator 12D, the second display controller 12E, the second acquisition unit 12F, the communication unit 12G, the output unit 12J, the updater 12K, the third acquisition unit 13L, the calculator 13M, and the decision unit 13P may be realized by causing a processing device such as a CPU, for example, to execute programs, that is, may be realized by software, or may be realized by hardware such as an IC, or may be realized by using software and hardware in combination.

The first acquisition unit 12A, the acceptor 12C, the generator 12D, the second display controller 12E, the second acquisition unit 12F, the communication unit 12G (first transmitter 12H and first receiver 12I), the output unit 12J, and the updater 12K are the same as those in the first embodiment.

The third acquisition unit 13L acquires the scheduled waiting time for the try-on subject. Specifically, the third acquisition unit 13L acquires the try-on subject ID and the scheduled waiting time for the try-on subject identified by the try-on subject ID. In the embodiment, the third acquisition unit 13L acquires the try-on subject ID and the scheduled waiting time from the second terminal 26. The user operates the input unit 26A of the second terminal 26 to input the try-on subject ID and the scheduled waiting time. The second terminal 26 transmits the try-on subject ID and the scheduled waiting time accepted from the input unit 26A to the virtual try-on apparatus 10A.

Alternatively, the third acquisition unit 13L may acquire the try-on subject ID and the scheduled waiting time from an input unit provided in the virtual try-on apparatus 10A but not illustrated.

The calculator 13M calculates the predicted time. Specifically, the calculator 13M calculates the predicted time from the number of clothing images corresponding to the characteristic information acquired by the first acquisition unit 12A in the first information.

More specifically, the calculator 13M calculates the number of clothing images of each of the kinds, from the clothing images corresponding to the characteristic information acquired by the first acquisition unit 12A in the first information. Then, the calculator 13M calculates the predicted time by multiplying the numbers of clothing images of the individual kinds and then multiplying the multiplied value by a constant. The constant is decided in advance.

For example, it is assumed that, in the first information, the number of clothing images of the kind "tops" is N1, the number of clothing images of the kind "inners" is N2, and the number of clothing images of the kind "bottoms" is N3, corresponding to the characteristic information (that is, three kinds of clothing correspond to the characteristic information). Each of the numbers N1, N2, and N3 is an integer of 1 or more.

In this case, there exist N1×N2×N3 combinations of clothing images. Thus, the calculator 13M calculates the predicted time using the following Equation (1):

$$ts = kN1N2N3 \quad (1)$$

where k denotes a constant and ts denotes a predicted time. The items ts, N1, N2, and N3 in Equation (1) are the same as described above.

The decision unit 13P decides at least one of the kinds and the number of clothing images to be displayed on the first display 24C such that at least one of the kinds and the number of clothing images to be displayed on the first display 24C decreases as the predicted time is longer relative to the scheduled waiting time.

In the embodiment, the decision unit 13P reads the display condition corresponding to the relationship between the scheduled waiting time acquired by the third acquisition unit 13L and the predicted time calculated by the calculator 13M in the fourth information (refer to FIG. 17). Accordingly, the decision unit 13P decides at least one of the kinds and the number of clothing images to be displayed on the first display 24C.

The first display controller 13B displays on the first display 24C the clothing images corresponding to the characteristic information acquired by the first acquisition unit 12A in the first information, as the first display controller 12B in the first embodiment does.

In the embodiment, the first display controller 13B displays on the first display 24C clothing images according to at least one of the kinds and the number decided by the decision unit 13P, out of the clothing images corresponding to the acquired characteristic information in the first information.

Accordingly, when the try-on subject views the first display 24C of the first terminal 24 to select the image of clothing to be tried on, the first display 24C of the first terminal 24 displays the clothing images corresponding to the characteristic information on the try-on subject, the number of the clothing images being in accordance with the relationship between the scheduled waiting time and the predicted time.

Next, a procedure for a virtual try-on process executed in the virtual try-on system 1A will be described.

Figure 18:
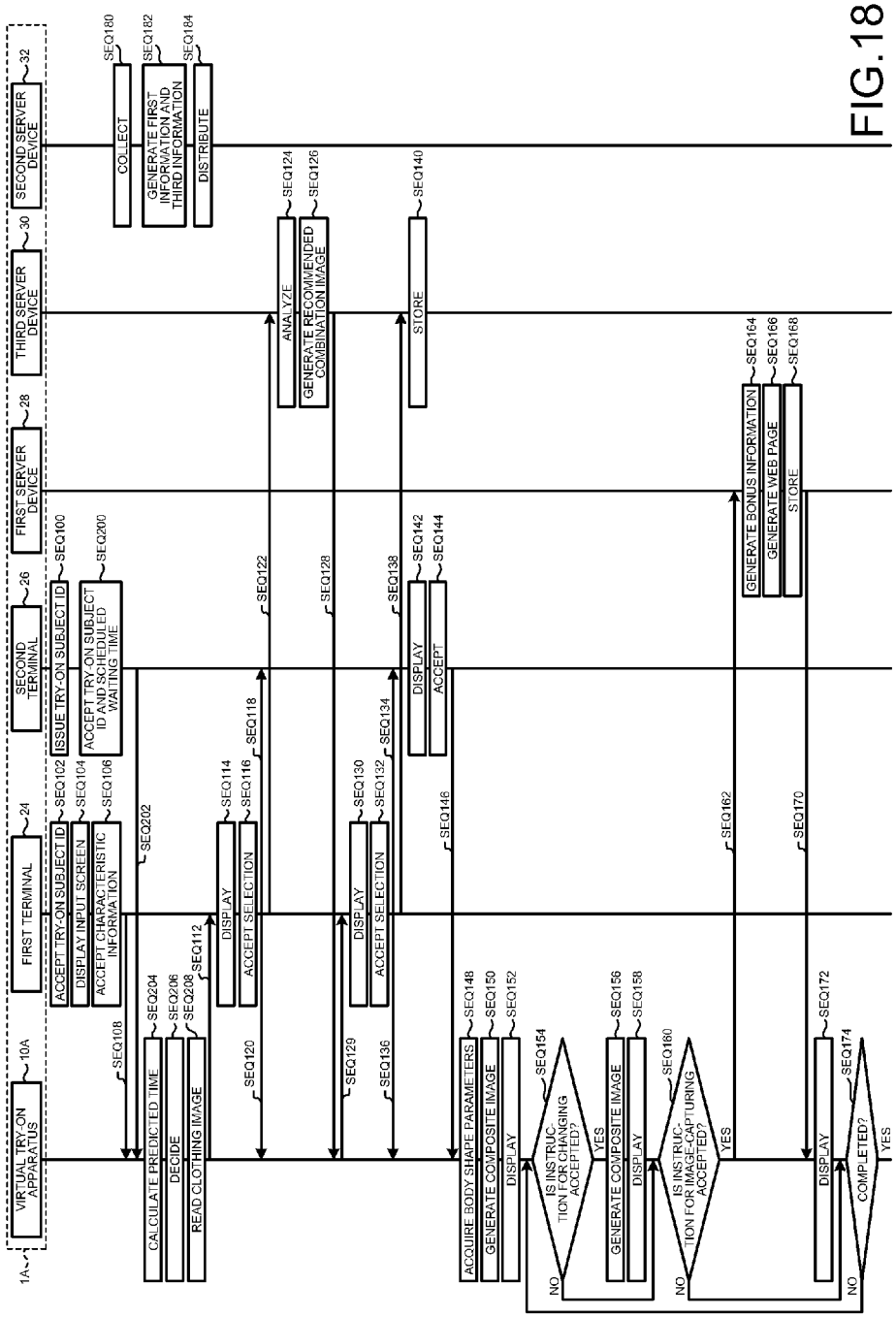
FIG. 18 is a sequence diagram illustrating a process for a virtual try-on process.

FIG. 18 is a sequence diagram illustrating the process for a virtual try-on process executed in the virtual try-on system 1A. The same steps as those of the process in the virtual try-on system 1 will be given the same sequence numbers as those of the process in the virtual try-on system 1, and descriptions thereof will be omitted or simplified.

First, the issuer 26F of the second terminal 26 issues the try-on subject ID (SEQ100). Next, the first terminal 24 accepts the try-on subject ID (SEQ102). Then, the display controller 24F displays on the first display 24C an input screen for inputting input items for identifying the characteristic information (SEQ104). Then, the acceptor 24E accepts the characteristic information (SEQ106). Then, the communication unit 24G transmits the characteristic information to the virtual try-on apparatus 10A (SEQ108).

Next, the second terminal 26 accepts the try-on subject ID and the scheduled waiting time (SEQ200). For example, the user operates the input unit 26A of the second terminal 26 to input the try-on subject ID and the scheduled waiting time for the try-on subject identified by the try-on subject ID. For example, the user may input a scheduled waiting time for each try-on subject through the use of the input unit 26A according to the congestion status in the store. The controller 26D of the second terminal 26 accepts the try-on subject ID and the scheduled waiting time from the input unit 26A and transmits the same to the virtual try-on apparatus 10A (SEQ202).

At the virtual try-on apparatus 10A, the first acquisition unit 12A acquires the characteristic information transmitted from the first terminal 24 at SEQ108. Also at the virtual try-on apparatus 10A, the third acquisition unit 13L acquires the try-on subject ID and the scheduled waiting time from the second terminal 26.

Next, the calculator 13M calculates the predicted time using the first information and the acquired characteristic information (SEQ204).

Next, the decision unit 13P decides at least one of the kinds and the number of clothing images to be displayed on the first display 24C according to the relationship between the predicted time calculated at SEQ204 and the scheduled waiting time acquired at SEQ202 (SEQ206).

Next, the first display controller 13B reads the clothing images according to at least one of the decided kinds and number, out of the clothing images corresponding to the acquired characteristic information in the first information (SEQ208). Then, the first display controller 13B transmits the read clothing images to the first terminal 24 (SEQ112).

The display controller 24F of the first terminal 24 displays a display screen containing the accepted clothing images on the first display 24C (SEQ114).

Then, the virtual try-on system 1A performs the steps SEQ114 to SEQ184. The steps SEQ114 to SEQ184 are the same as those in the first embodiment except that the steps performed by the first display controller 12B in the first embodiment are performed by the first display controller 13B in the embodiment. Thus, descriptions of these steps will be omitted.

As described above, the virtual try-on apparatus 10A of the embodiment includes the first acquisition unit 12A, the third acquisition unit 13L, the calculator 13M, the decision unit 13P, the first display controller 13B, the acceptor 12C, the generator 12D, and the second display controller 12E.

The first acquisition unit 12A acquires the characteristic information on the try-on subject. The third acquisition unit 13L acquires the scheduled waiting time for the try-on subject. The calculator 13M calculates the predicted time necessary for the try-on subject to select clothing to be tried on from among a plurality of clothing images displayed on the first display 24C. The decision unit 13P decides at least one of the kinds and the number of clothing images to be displayed on the first display 24C such that at least one of the kinds and the number of clothing images to be displayed on the first display 24C decreases as the predicted time is longer relative to the scheduled waiting time. The first display controller 13B displays on the first display 24C the clothing images according to at least one of the decided kinds and number, out of the clothing images corresponding to the acquired characteristic information in the first information. The acceptor 12C accepts from the try-on subject a selection of the image of clothing to be tried on, from among the clothing images displayed on the first display 24C. The generator 12D generates a composite image of the try-on subject image and the selected clothing image. The second display controller 12E displays the composite image on the second display 18.

The virtual try-on apparatus 10A of the embodiment displays on the first display 24C a list of the clothing images corresponding to the characteristic information on the try-on subject out of the clothing images included in the first information, the number of the displayed clothing images being in accordance with the relationship between the scheduled waiting time and the predicted time.

Accordingly, the virtual try-on apparatus 10A can display on the first display 24C the clothing images of the number and kinds to allow the try-on subject to select images of a plurality of pieces of clothing to be tried on in at least one kind of combination within the scheduled waiting time.

Therefore, the virtual try-on apparatus 10A of the embodiment can provide a virtual try-on service suited for each try-on subject.

Third Embodiment

In the embodiment, display screens to be displayed at the time of selection of the image of clothing to be tried on are changed according to the characteristic information on the try-on subject as described below.

FIG. 1 is a schematic view of a virtual try-on system 1B in the embodiment.

The virtual try-on system 1B includes a virtual try-on apparatus 10B, a first terminal 24, a second terminal 26, a first server device 28, a third server device 30, and a second server device 32. The virtual try-on apparatus 10B, the first terminal 24, the second terminal 26, the first server device 28, the third server device 30, and the second server device 32 are connected together via a publicly-known communication network such as the Internet.

The virtual try-on system 1B is configured in the same manner as the virtual try-on system 1 in the first embodiment except that the virtual try-on apparatus 10B is provided instead of the virtual try-on apparatus 10.

The virtual try-on apparatus 10B includes a controller 15, a storage 14B, and a main body unit 16. The main body unit 16 includes an image-capturing unit 20, a second display 18, and an illuminator 22. The main body unit 16 is the same as that in the first embodiment. The storage 14B, the controller 15, and the main body unit 16 are connected together so as to be capable of transmitting and receiving signals.

FIG. 19 is a functional block diagram of the virtual try-on apparatus 10B.

The storage 14B is a publicly-known hard disc device. The storage 14B stores various data. In the embodiment, the storage 14B stores various data such as first information, second information, and fifth information. The first information and the second information are the same as those in the first embodiment.

The fifth information has associations between characteristic information and screen designs. FIG. 20 is a diagram illustrating one example of a data structure of the fifth information.

The characteristic information is the same as that in the first embodiment. That is, the characteristic information includes at least one of outer characteristics and inner characteristics of the try-on subject.

Specifically, the characteristic information represents at least one of the body shape parameters indicative of the body shape of the try-on subject, the characteristic color of the try-on subject, the age bracket in which the try-on subject resides, the try-on subject's personality, and the try-on subject's preferences.

The screen design represents the background color of a display screen, the display size of at least one of data items and clothing images to be displayed on the display screen, the colors of the data items, and the display positions of at least one of the data items and the clothing images to be displayed on the display screen corresponding to the characteristic information. The data items to be displayed on the display screen constitute images other than the clothing images on the display screen. The data items to be displayed on the display screen are button images for performing various instructions for operations, character images for providing descriptions to the try-on subject.

The fifth information is set in advance according to an instruction from the user operating an input unit not illustrated and is stored in the storage 14B. Alternatively, the fifth information may be generated in advance in an external device and stored in the storage 14B.

The fifth information has a corresponding screen design set such that, as the age bracket in the characteristic information represents older ages, the display size of at least one of the data items and the clothing images to be displayed on the display screen becomes larger, for example. In addition, the fifth information has a corresponding screen design including the data item colors and background color similar to the characteristic color in the characteristic information, for example.

Returning to FIG. 19, the controller 15 includes a first acquisition unit 12A, a first display controller 15B, an acceptor 12C, a generator 15D, a second display controller 12E, a second acquisition unit 12F, a communication unit 12G (first transmitter 12H and first receiver 12I), an output unit 12J, and an updater 12K.

Some or all of the first acquisition unit 12A, the first display controller 15B, the acceptor 12C, the generator 15D, the second display controller 12E, the second acquisition unit 12F, the communication unit 12G (first transmitter 12H and first receiver 12I), the output unit 12J, and the updater 12K may be realized by causing a processing device such as a CPU, for example, to execute programs, that is, may be realized by software, or may be realized by hardware such as an IC, or may be realized by using software and hardware in combination.

The first acquisition unit 12A, the acceptor 12C, the second display controller 12E, the second acquisition unit 12F, the communication unit 12G (first transmitter 12H and first receiver 12I), the output unit 12J, and the updater 12K are the same as those in the first embodiment.

The first display controller 15B displays on the first display 24C the clothing images corresponding to the characteristic information acquired by the first acquisition unit 12A in the first information, as the first display controller 12B in the first embodiment does.

In the embodiment, the first display controller 15B generates a display screen containing the clothing images corresponding to the acquired characteristic information in the first information according to the acquired characteristic information, and displays the same on the first display 24C.

Specifically, the first display controller 15B generates at least one of the display size of at least one of the data items and the clothing images to be displayed on the display screen, the colors of the data items, and the display position on the display screen of at least one of the data items and the clothing images according to the characteristic information, and then displays the same on the first display 24C.

More specifically, the first display controller 15B reads the screen design corresponding to the acquired characteristic information, from the fifth information (refer to FIG. 20). Then, the first display controller 15B arranges the clothing images corresponding to the acquired characteristic information in the first information, at the positions and in the sizes corresponding to the read screen design. In addition, the first display controller 15B adjusts the pre-decided data items on the display screen to the display positions, the sizes, and the colors according to the acquired characteristic information. Accordingly, the first display controller 15B generates a display screen of the screen design according to the acquired characteristic information, and then displays the same on the first display 24C.

Thus, the display screen on the first display 24C of the first terminal 24 to be viewed by the try-on subject to select the image of clothing to be tried on, can be provided with the screen design according to the characteristic information on the try-on subject.

The generator 15D generates a composite image of the try-on subject image and the selected clothing image, as the generator 12D in the first embodiment does. In the embodiment, the generator 15D further generates a composite image in which the try-on subject image and the selected clothing image are superimposed on a background image according to the characteristic information.

The generator 15D stores in advance the background image according to the characteristic information in the storage 14B. The background image is an image of a color and a scene according to the characteristic information. Then, the generator 15D reads the background image according to the characteristic information on the try-on subject from the storage 14B to generate a composite image using the same.

Next, a procedure for a virtual try-on process executed in the virtual try-on system 1B will be described.

Figure 21:
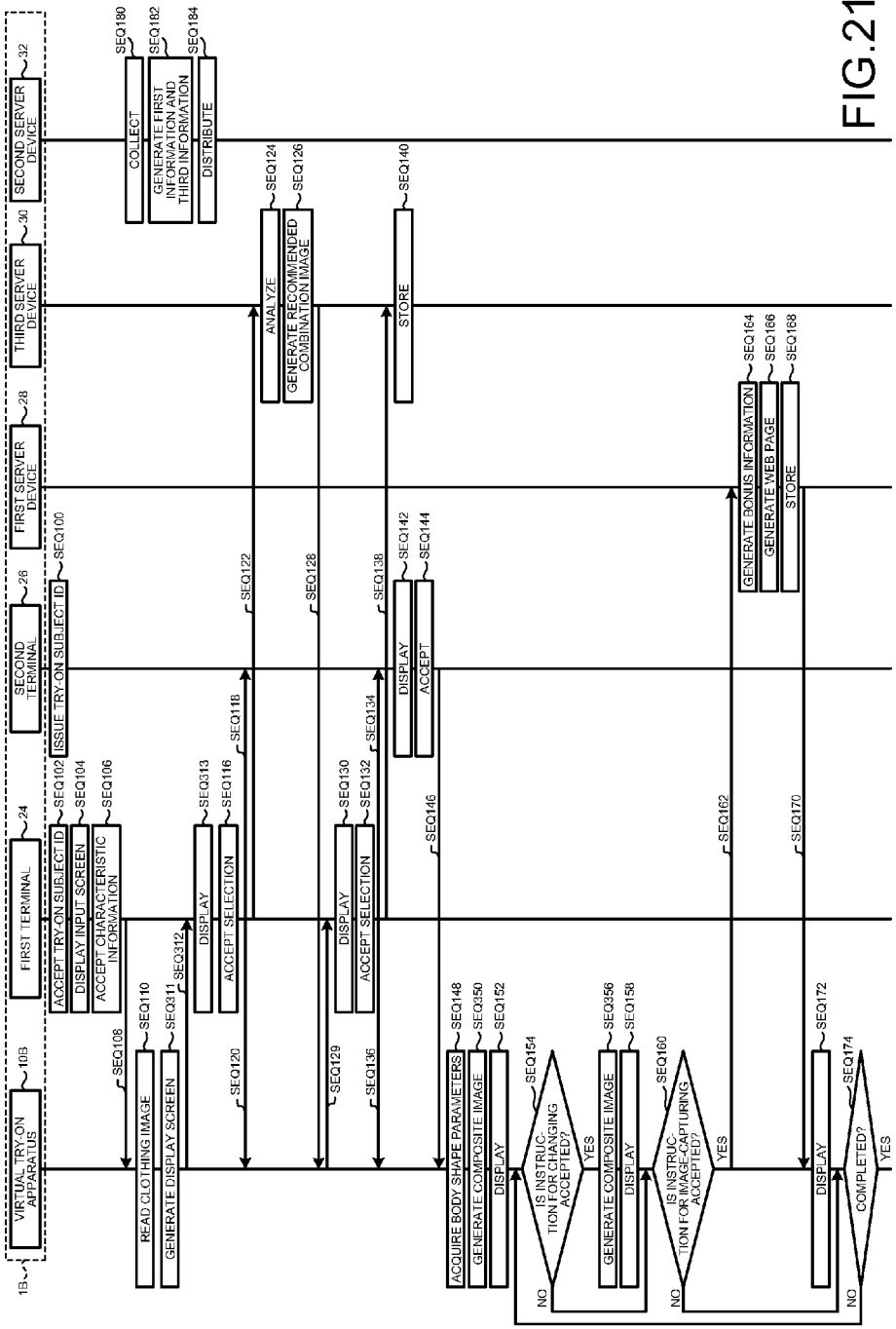
FIG. 21 is a sequence diagram illustrating a process for a virtual try-on process.

FIG. 21 is a sequence diagram illustrating the process for a virtual try-on process executed in the virtual try-on system 1B. The same steps as those in the virtual try-on system 1 will be given the same sequence numbers as those in the virtual try-on system 1, and descriptions thereof will be omitted or simplified.

First, the issuer 26F of the second terminal 26 issues the try-on subject ID (SEQ100). Next, the first terminal 24 accepts the try-on subject ID (SEQ102). Then, the display controller 24F displays on the first display 24C an input screen for inputting input items to identify the characteristic information (SEQ104). Then, the acceptor 24E accepts the characteristic information (SEQ106). Then, the communication unit 24G transmits the characteristic information to the virtual try-on apparatus 10B (SEQ108).

Next, the first display controller 15B reads the clothing images corresponding to the acquired characteristic information in the first information (SEQ110). Then, the first display controller 15B generates a display screen containing the clothing images read at SEQ110, according to the screen design corresponding to the characteristic information acquired at SEQ108 (SEQ311). Then, the first display controller 15B transmits the generated display screen to the first terminal 24 (SEQ312).

The display controller 24F of the first terminal 24 displays the received display screen on the first display 24C (SEQ313).

FIG. 22 illustrates examples of display screens. In FIG. 22, (A) illustrates one example of a display screen 50 in the case where the characteristic color of the try-on subject in the characteristic information is a color forming an impression of "spring." In FIG. 22, (B) illustrates one example of a display screen 52 in the case where the characteristic color of the try-on subject in the characteristic information is a color forming an impression of "autumn."

As illustrated in FIG. 22, the color of an area 50A in the display screen 50 and the color of a corresponding area 52A in the display screen 52 are different from each other according to the characteristic information on the try-on subjects. In addition, the color of an area 50B in the display screen 50 and the color of a corresponding area 52B in the display screen 52 are different from each other according to the characteristic information on the try-on subjects. The screen design is not limited to those illustrated in FIG. 22.

Returning to FIG. 21, the virtual try-on system 1B executes the steps SEQ116 to SEQ148. The steps SEQ116 to SEQ148 are the same as those in the first embodiment, and thus descriptions thereof will be omitted.

Next, the generator 15D generates a composite image in which the try-on subject image shot by the first image-capturing unit 20A and the clothing images corresponding to the clothing IDs included in the second information (refer to FIG. 5) received at SEQ146 are superimposed on the background image corresponding to the characteristic information acquired at SEQ106 (SEQ350).

Next, the second display controller 12E displays the composite image generated at SEQ350 on the second display 18 (SEQ152). Next, the acceptor 12C determines whether an instruction for changing the composite images has been accepted (SEQ154).

When an affirmative determination is made at SEQ154 (SEQ154: Yes), the generator 12D searches the storage 14B for other second information including the try-on subject ID included in the second information corresponding to the composite image previously displayed on the second display 18, and reads one piece of the second information not yet displayed in any composite image. Then, the generator 12D uses the read second information to generate a composite image in the same manner as at SEQ350 (SEQ356).

Then, the virtual try-on system 1B executes the steps SEQ158 to SEQ184 in the same manner as in the first embodiment.

As described above, the virtual try-on apparatus 10B of the embodiment includes the first acquisition unit 12A, the first display controller 15B, the acceptor 12C, the generator 15D, and the second display controller 12E. The first acquisition unit 12A acquires the characteristic information on the try-on subject. The first display controller 15B generates a display screen containing the clothing images corresponding to the acquired characteristic information in the first information, according to the acquired characteristic information, and displays the same on the first display 24C. The acceptor 12C accepts from the try-on subject a selection of the image of clothing to be tried on from among the clothing images displayed on the first display 24C. The generator 15D generates a composite image of the try-on subject image and the selected clothing image. The second display controller 12E displays the composite image on the second display 18.

In such a manner as described above, the virtual try-on apparatus 10B of the embodiment generates the display screen containing the clothing images corresponding to the acquired characteristic information in the first information according to the acquired characteristic information, and displays the same on the first display 24C.

Therefore, the virtual try-on apparatus 10B of the embodiment can provide a virtual try-on service suited for each try-on subject.

Fourth Embodiment

Figure 23:
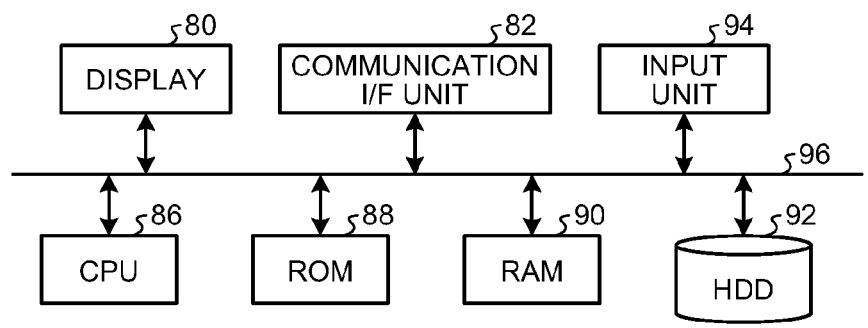
FIG. 23 is a block diagram illustrating an example of a hardware configuration.

Next, a hardware configuration of the virtual try-on apparatus 10, the virtual try-on apparatus 10A, the virtual try-on apparatus 10B, the first terminal 24, the second terminal 26, the first server device 28, the third server device 30, and the second server device 32 in the first to third embodiments will be described. FIG. 23 is a block diagram illustrating an example of the hardware configuration of the virtual try-on apparatus 10, the virtual try-on apparatus 10A, the virtual try-on apparatus 10B, the first terminal 24, the second terminal 26, the first server device 28, the third server device 30, and the second server device 32 in the first to third embodiments.

The virtual try-on apparatus 10, the virtual try-on apparatus 10A, the virtual try-on apparatus 10B, the first terminal 24, the second terminal 26, the first server device 28, the third server device 30, and the second server device 32 in the first to third embodiments have a hardware configuration using a general computer in which a display 80, a communication I/F unit 82, an input unit 94, a CPU 86, a ROM (read only memory) 88, a RAM (random access memory) 90, a HDD 92, and the like are connected together via a bus 96.

The CPU 86 is a computing unit that controls various processes at the virtual try-on apparatus 10, the virtual try-on apparatus 10A, the virtual try-on apparatus 10B, the first terminal 24, the second terminal 26, the first server device 28, the third server device 30, and the second server device 32. The RAM 90 stores data necessary for the various processes at the CPU 86. The ROM 88 stores programs for realizing the various processes at the CPU 86. The HDD 92 saves data to be stored in the storages 14, 14A, and 14B described above. The communication I/F unit 82 is an interface to connect to an external device or an external terminal via a communication line or the like and exchange data with the connected external device or external terminal. The display 80 is equivalent to each of the second display 18, the first display 24C, the display 26C, the display 32C, the display 30C, and the display 28C described above. The input unit 94 accepts instructions for operation from the user.

The programs for realizing the foregoing various processes executed at the virtual try-on apparatus 10, the virtual try-on apparatus 10A, the virtual try-on apparatus 10B, the first terminal 24, the second terminal 26, the first server device 28, the third server device 30, and the second server device 32 in the first to third embodiments are incorporated in advance into the ROM 88 or the like, and are provided.

The programs to be executed at the virtual try-on apparatus 10, the virtual try-on apparatus 10A, the virtual try-on apparatus 10B, the first terminal 24, the second terminal 26, the first server device 28, the third server device 30, and the second server device 32 in the first to third embodiments may be stored, in the form of files installable into these devices or executable at these devices, in a computer-readable storage medium such as a CD-ROM, flexible disc (FD), CD-R, or DVD (digital versatile disc), and are provided as a computer program product.

Alternatively, the programs to be executed at the virtual try-on apparatus 10, the virtual try-on apparatus 10A, the virtual try-on apparatus 10B, the first terminal 24, the second terminal 26, the first server device 28, the third server device 30, and the second server device 32 in the first to third embodiments may be stored in a computer connected to a network such as the Internet and may be provided by being downloaded via the network. Still alternatively, the programs for executing the foregoing processes at the virtual try-on apparatus 10, the virtual try-on apparatus 10A, the virtual try-on apparatus 10B, the first terminal 24, the second terminal 26, the first server device 28, the third server device 30, and the second server device 32 in the first to third embodiments may be provided or distributed via a network such as the Internet.

The programs for realizing the foregoing various processes executed at the virtual try-on apparatus 10, the virtual try-on apparatus 10A, the virtual try-on apparatus 10B, the first terminal 24, the second terminal 26, the first server device 28, the third server device 30, and the second server device 32 in the first to third embodiments are configured to generate the foregoing units on a main storage device.

The various kinds of information stored in the HDD 92 may be stored in an external device. In this case, the external device and the CPU 86 are connected together via a network or the like.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A virtual try-on apparatus comprising:
a processor; and
a memory that stores instructions that, when executed by the processor, facilitate performance of operations, comprising:
acquiring characteristic information on a try-on subject;
generating a display screen according to the acquired characteristic information and displaying the display screen on a first display, the display screen containing clothing images corresponding to the acquired characteristic information in first information in which the characteristic information and the clothing images are associated with each other, wherein the generating further comprises generating the display screen of a screen design according to the characteristic information and displaying the display screen on the first display;
accepting from the try-on subject a selection of an image of clothing to be tried on from among the clothing images displayed on the first display;
generating a composite image of a try-on subject image of the try-on subject and the selected clothing image, and displaying the composite image on a second display, and
transmitting try-on information to a first server device, wherein
the characteristic information includes at least an inner characteristic of the try-on subject, and
the operations further comprise:
in generating of the display screen, generating, based on the characteristic information, at least one of: a background color of the display screen, a display size of at least either of data items or the clothing images to be displayed on the display screen, colors of the data items, and a display position on the display screen of the at least either of the data items or the clothing images, and displaying the generated one on the first display,
in generating of the composite image, generating the composite image in which the try-on subject image and the selected clothing image are superimposed on a background image of a color or a scene based on the characteristic information, and displaying the composite image
in the accepting, accepting a pre-decided motion of the try-on subject as pre-decided instruction information corresponding to the motion, the instruction information being an instruction for capturing the composite image displayed on the second display,
in displaying of the composite image, displaying on the second display, the composite image including at least one of the instruction image and second time information indicative of a remaining time before confirmation of the instruction for capturing; and displaying, after a lapse of the remaining time indicated by the second time information, on the second display, the composite image including at least one of the instruction image and third time information indicative of a remaining time before execution of a process according to the instruction for capturing, and
in the transmitting, transmitting, after a lapse of the remaining time indicated by the third time information, to the first server device the try-on information included in the composite image displayed on the second display, the try-on information including first identification information of one or more of the clothing images, second identification information of the try-on subject image included in the composite image, and a clothing image of clothing identified by the first identification information.

2. The apparatus according to claim 1, wherein the characteristic information includes at least either of outer characteristics or try-on subject's preferences of the try-on subject.

3. The apparatus according to claim 1, wherein the characteristic information represents at least one of: body shape parameters indicative of the body shape of the try-on subject, characteristic color of the try-on subject, age bracket in which the try-on subject resides, try-on subject's personality, and try-on subject's preferences.

4. The apparatus according to claim 1, wherein the operations further comprise:
  accepting a pre-decided motion of the try-on subject as pre-decided instruction information corresponding to the motion, and
  displaying on the second display, the composite image including at least one of an instruction image indicative of the accepted instruction information and first time information indicative of a remaining time required before completion of a process corresponding to the instruction information.

5. The apparatus according to claim 4, wherein
the instruction information is an instruction for changing the composite image, and wherein the operations further comprise
  displaying on the second display, the composite image including at least one of the instruction image and the first time information indicative of the remaining time required before display of the changed composite image, and
  displaying the changed composite image on the second display after a lapse of the remaining time indicated by the first time information.

6. The apparatus according to claim 1, wherein
generating of the display screen generates the display screen having a screen design such that, as an age bracket in the characteristic information represents an older age, a display size of at least one of data items and the clothing images to be displayed on the display screen becomes larger.

7. The apparatus according to claim 1, wherein
generating of the display screen generates the display screen having a screen design including a data item color and a background color similar to a characteristic color in the characteristic information.

8. A virtual try-on method comprising:
  acquiring characteristic information on a try-on subject;
  generating a display screen according to the acquired characteristic information and displaying the display screen on a first display, the display screen containing clothing images corresponding to the acquired characteristic information in first information in which the characteristic information and the clothing images are associated with each other, wherein the generating further comprises generating the display screen of a screen design according to the characteristic information and displaying the display screen on the first display;
  accepting from the try-on subject a selection of an image of clothing to be tried on from among the clothing images displayed on the first display;
  generating a composite image of a try-on subject image of the try-on subject and the selected clothing image, and displaying the composite image on a second display, and
  transmitting try-on information to a first server device, wherein
  the characteristic information includes at least an inner characteristic of the try-on subject, and
  the method further comprises:
  in generating of the display screen, generating, based on the characteristic information, at least one of: a background color of the display screen, a display size of at least either of data items or the clothing images to be displayed on the display screen, colors of the data items, and a display position on the display screen of the at least either of the data items or the clothing images, and displaying the generated one on the first display,
  in generating of the composite image, generating the composite image in which the try-on subject image and the selected clothing image are superimposed on a background image of a color or a scene based on the characteristic information, and displaying the composite image,
  in the accepting, accepting a pre-decided motion of the try-on subject as pre-decided instruction information corresponding to the motion, the instruction information being an instruction for capturing the composite image displayed on the second display,
  in displaying of the composite image, displaying on the second display, the composite image including at least one of the instruction image and second time information indicative of a remaining time before confirmation of the instruction for capturing; and displaying, after a lapse of the remaining time indicated by the second time information, on the second display, the composite image including at least one of the instruction image and third time information indicative of a remaining time before execution of a process according to the instruction for capturing, and
  in the transmitting, transmitting, after a lapse of the remaining time indicated by the third time information, to the first server device the try-on information included in the composite image displayed on the second display, the try-on information including first identification information of one or more of the clothing images, second identification information of the try-on subject image included in the composite image, and a clothing image of clothing identified by the first identification information.

9. A computer program product comprising a non-transitory computer-readable medium containing a program executed by a computer, the program causing the computer to execute:
  acquiring characteristic information on a try-on subject;
  generating a display screen according to the acquired characteristic information and displaying the display screen on a first display, the display screen containing clothing images corresponding to the acquired characteristic information in first information in which the characteristic information and the clothing images are associated with each other, wherein the generating further comprises generating the display screen of a screen design according to the characteristic information and displaying the display screen on the first display;

accepting from the try-on subject a selection of an image of clothing to be tried on from among the clothing images displayed on the first display;

generating a composite image of a try-on subject image of the try-on subject and the selected clothing image, and displaying the composite image on a second display, and transmitting try-on information to a first server device, wherein the characteristic information includes at least an inner characteristic of the try-on subject, and the program further causes the computer to execute:

in generating of the display screen, generating, based on the characteristic information, at least one of: a background color of the display screen, a display size of at least either of data items or the clothing images to be displayed on the display screen, colors of the data items, and a display position on the display screen of the at least either of the data items or the clothing images, and displaying the generated one on the first display, in generating of the composite image, generating the composite image in which the try-on subject image and the selected clothing image are superimposed on a background image of a color or a scene based on the characteristic information, and displaying the composite image, in the accepting, accepting a pre-decided motion of the try-on subject as pre-decided instruction information corresponding to the motion, the instruction information being an instruction for capturing the composite image displayed on the second display, in displaying of the composite image, displaying on the second display, the composite image including at least one of the instruction image and second time information indicative of a remaining time before confirmation of the instruction for capturing; and displaying, after a lapse of the remaining time indicated by the second time information, on the second display, the composite image including at least one of the instruction image and third time information indicative of a remaining time before execution of a process according to the instruction for capturing, and in the transmitting, transmitting, after a lapse of the remaining time indicated by the third time information, to the first server device the try-on information included in the composite image displayed on the second display, the try-on information including first identification information of one or more of the clothing images, second identification information of the try-on subject image included in the composite image, and a clothing image of clothing identified by the first identification information.

* * * * *